(12) United States Patent
Melvin et al.

(10) Patent No.: US 11,743,955 B2
(45) Date of Patent: Aug. 29, 2023

(54) FACEPLATE-BASED WIRELESS FUNCTIONALITY DEVICE

(71) Applicant: Level 3 Communications, LLC, Broomfield, CO (US)

(72) Inventors: Luree Melvin, Frederick, CO (US); Gregory Wallace, Richmond Hill, GA (US)

(73) Assignee: Level 3 Communications, LLC, Broomfield, CO (US)

( * ) Notice: Subject to any disclaimer, the term of this patent is extended or adjusted under 35 U.S.C. 154(b) by 107 days.

(21) Appl. No.: 17/488,681

(22) Filed: Sep. 29, 2021

(65) Prior Publication Data

US 2023/0053427 A1 Feb. 23, 2023

Related U.S. Application Data

(60) Provisional application No. 63/234,299, filed on Aug. 18, 2021.

(51) Int. Cl.
| | | |
|---|---|---|
| *H04W 76/14* | (2018.01) | |
| *H04B 7/04* | (2017.01) | |
| *H04W 4/20* | (2018.01) | |
| *H04W 84/18* | (2009.01) | |

(52) U.S. Cl.
CPC ............ *H04W 76/14* (2018.02); *H04W 4/20* (2013.01); *H04W 84/18* (2013.01)

(58) Field of Classification Search
CPC ....... H04W 76/14; H04W 4/20; H04W 84/18; H04B 1/0064; H04B 7/02; H04B 7/04
See application file for complete search history.

(56) References Cited

U.S. PATENT DOCUMENTS

| | | | |
|---|---|---|---|
| 10,374,303 B1 * | 8/2019 | Matute | H01Q 1/22 |
| 11,367,288 B1 * | 6/2022 | Richardson | H05B 47/19 |
| 11,405,126 B1 * | 8/2022 | Graham | H04B 17/102 |
| 2010/0080203 A1 * | 4/2010 | Reynolds | H04N 21/654 |
| | | | 370/338 |
| 2017/0322049 A1 * | 11/2017 | Wootton | G01J 1/4204 |
| 2018/0103411 A1 * | 4/2018 | Greene | H04W 40/32 |
| 2018/0145844 A1 * | 5/2018 | Pera | H04L 12/2803 |
| 2019/0288369 A1 * | 9/2019 | Donkle | H01Q 1/2233 |
| 2020/0170516 A1 * | 6/2020 | Ayers | A61B 5/0205 |
| 2021/0204339 A1 * | 7/2021 | Loh | H04W 76/14 |
| 2022/0205277 A1 * | 6/2022 | Leiponis | E05B 47/0046 |

* cited by examiner

*Primary Examiner* — Andrew Wendell

(57) ABSTRACT

Novel tools and techniques are provided for implementing wireless functionality, and, more particularly, to methods, systems, and apparatuses for implementing faceplate-based wireless device functionality and wireless extension functionality. In various embodiments, one or more antennas, a power adapter, and at least one processor may be attached to an inner surface of a faceplate configured to be attached to a wall. The one or more antennas may be electrically coupled to the power adapter and communicatively coupled to the at least one processor. Alternatively, a wireless functionality device might include one or more antennas, a power adapter, and at least one processor. The wireless functionality device may be attached to an inner surface of a faceplate configured to be attached to a wall. The one or more antennas of the wireless functionality device may be electrically coupled to the power adapter and communicatively coupled to the at least one processor.

19 Claims, 14 Drawing Sheets

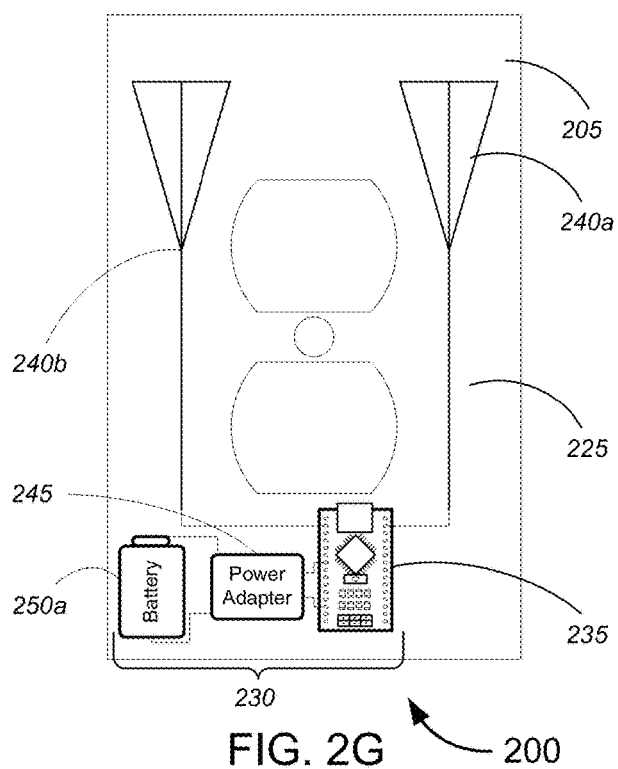
FIG. 2G
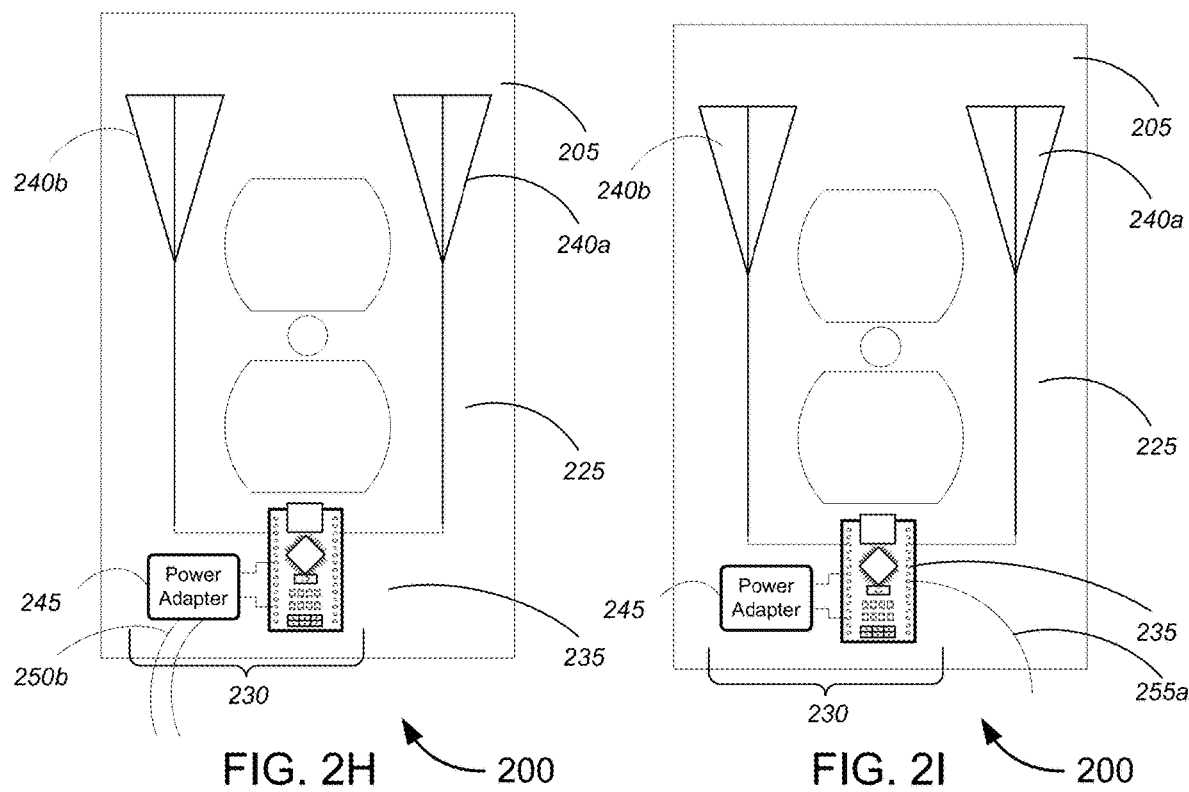
FIG. 2H
FIG. 2I

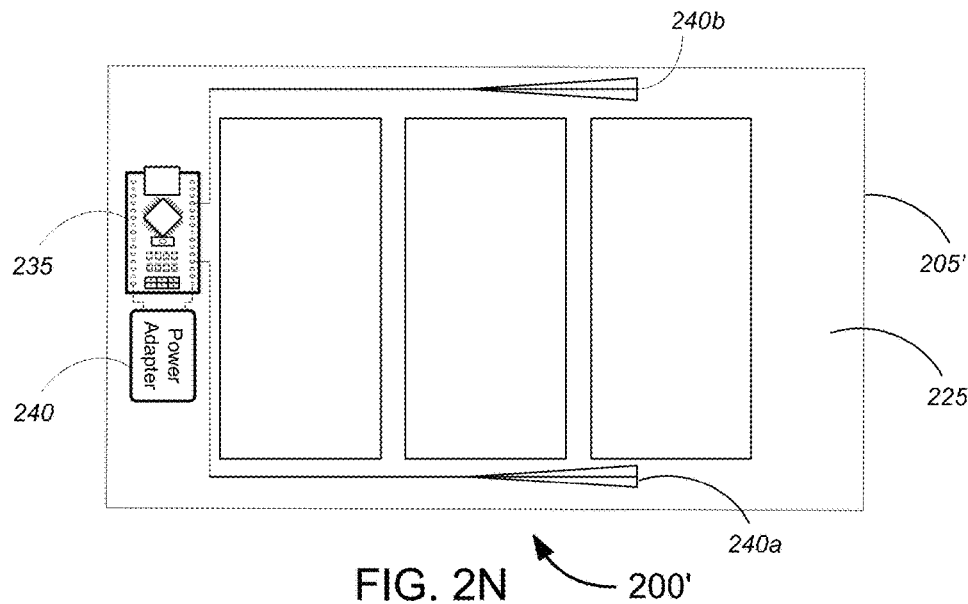
FIG. 2N
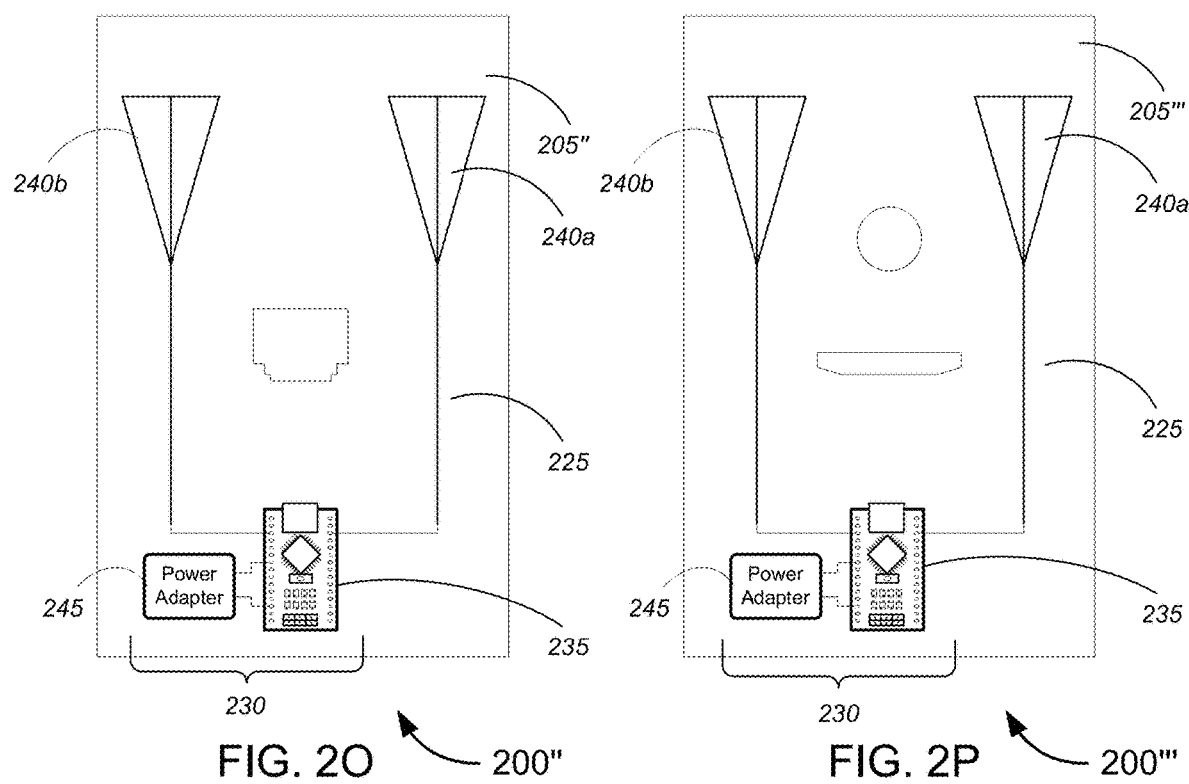
FIG. 2O
FIG. 2P

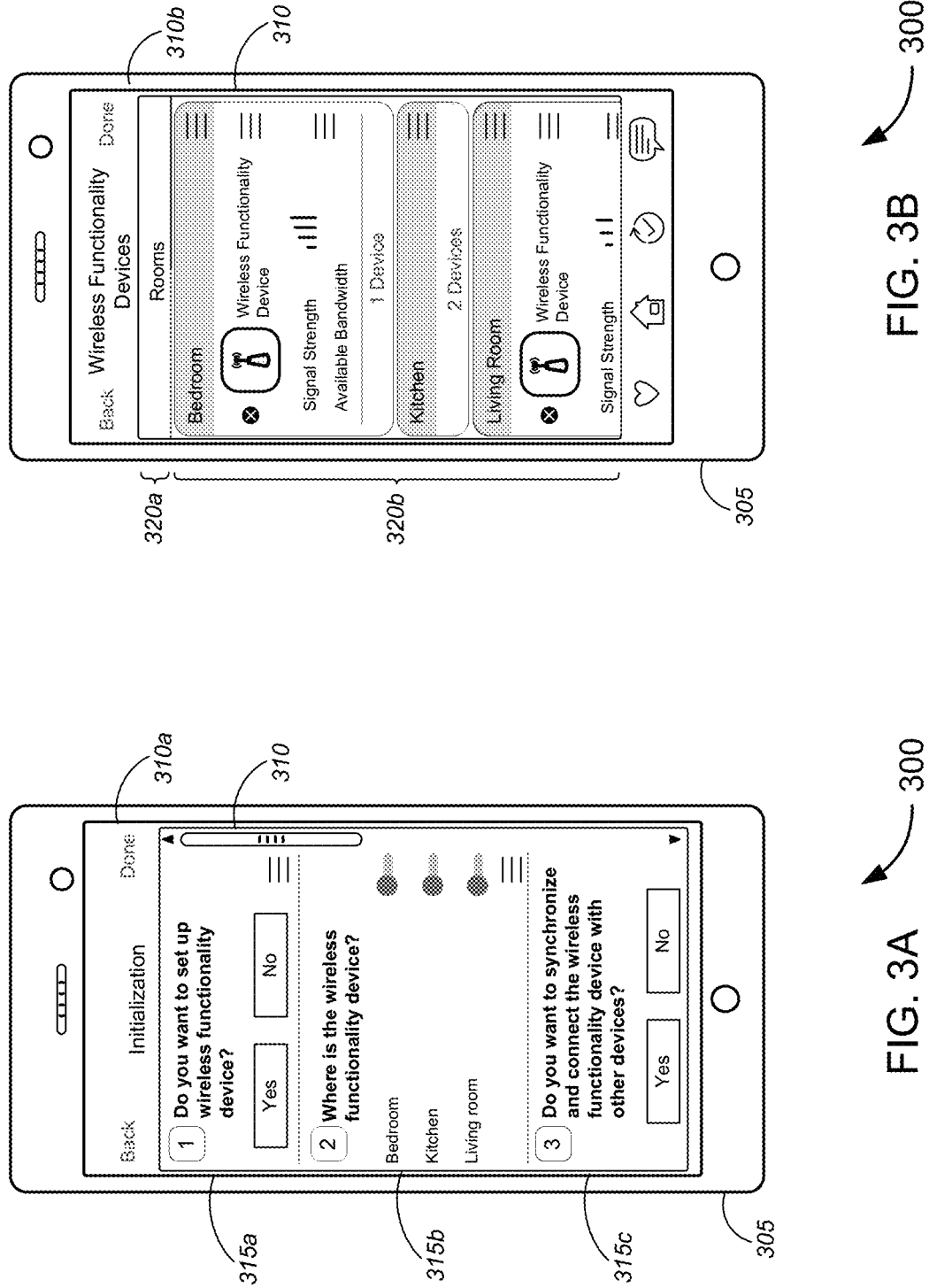

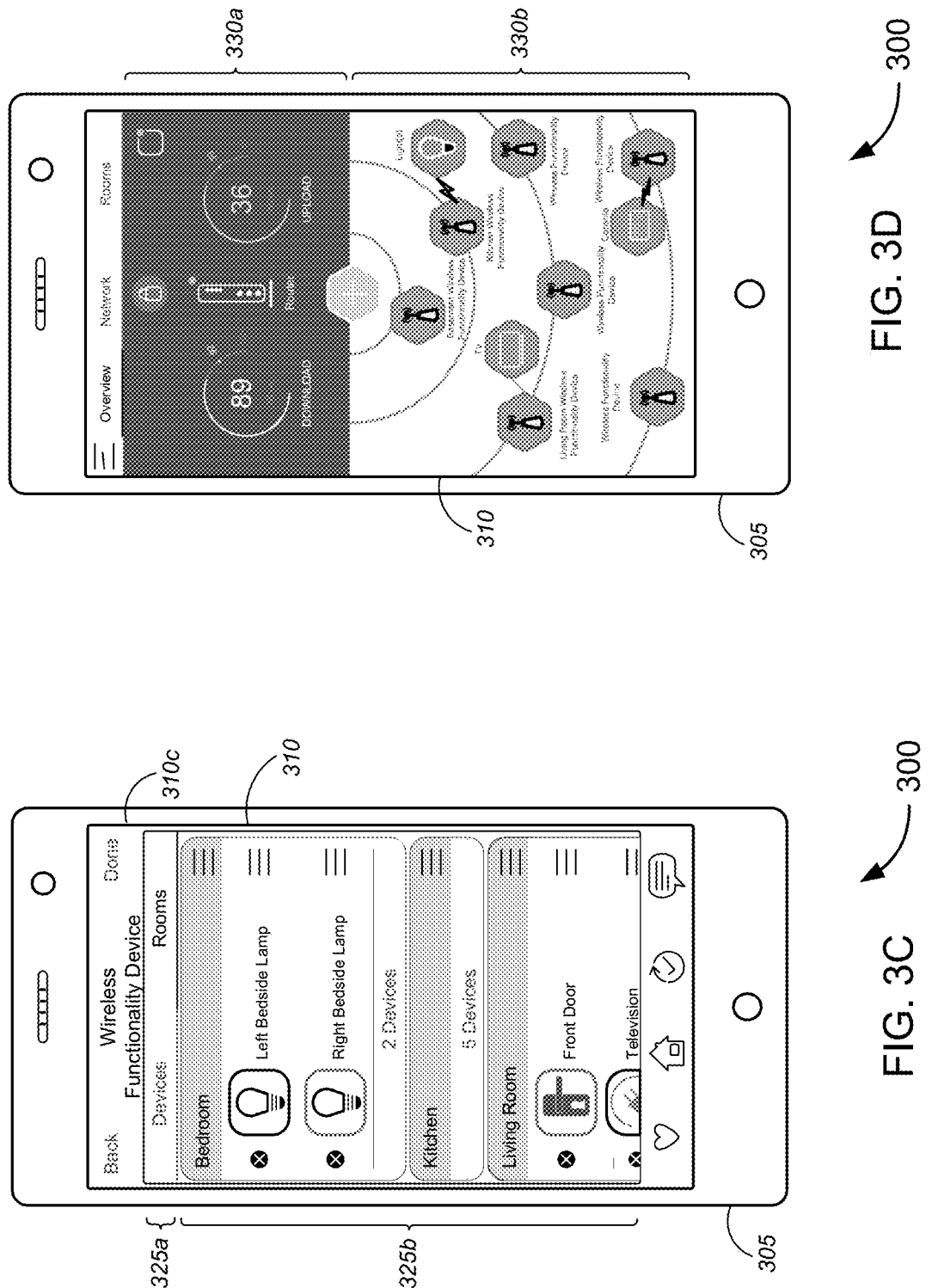

FACEPLATE-BASED WIRELESS FUNCTIONALITY DEVICE

CROSS-REFERENCES TO RELATED APPLICATIONS

This application claims priority to U.S. Patent Application Ser. No. 63/234,299 (the "'299 Application"), filed Aug. 18, 2021 by Luree Melvin, et al., entitled, "Faceplate-Based Wireless Functionality Device," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing wireless functionality, and, more particularly, to methods, systems, and apparatuses for implementing faceplate-based wireless device functionality and wireless extension functionality.

BACKGROUND

Conventional wireless devices and wireless extension devices, such as WiFi extenders, either plug into electrical wall outlets disposed on a wall of a customer premises or have one or more wires that plug into electrical wall outlets disposed on a wall of a customer premises. Such devices are typically always visible within a customer premises and do not blend aesthetically within the customer premises.

Hence, there is a need for more robust and scalable solutions for implementing wireless functionality, and, more particularly, to methods, systems, and apparatuses for implementing faceplate-based wireless device functionality and wireless extension functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3D are illustrations of one or more software applications ("apps") running on user devices for interacting with one or more faceplate-based wireless functionality devices within a customer premises, in accordance with various embodiments.

DETAILED DESCRIPTION OF CERTAIN EMBODIMENTS

Overview

Figure 1:
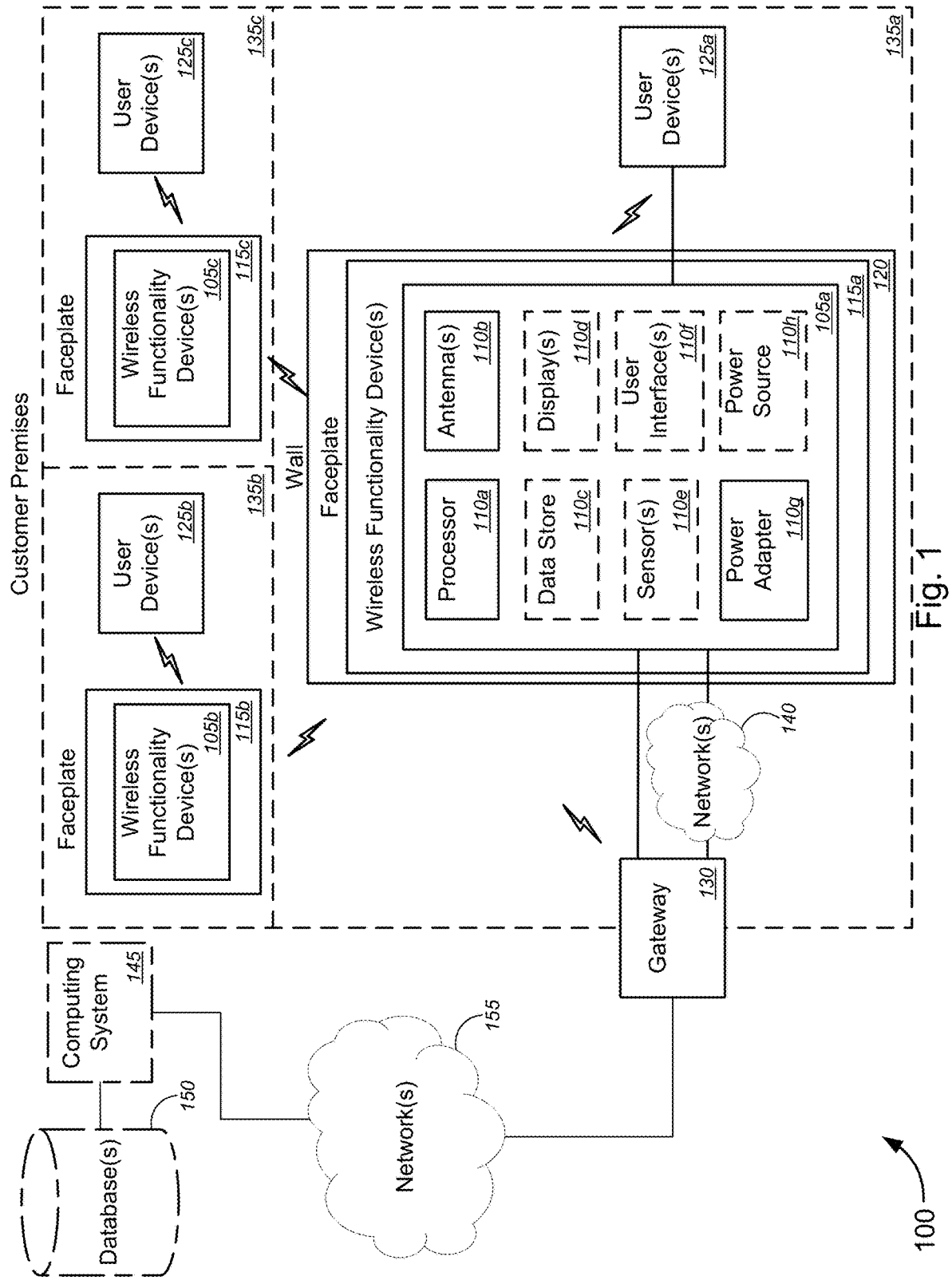
FIG. 1 is a schematic diagram illustrating a system for implementing for implementing faceplate-based wireless device functionality, in accordance with various embodiments.

Various embodiments provide tools and techniques for implementing wireless functionality, and, more particularly, to methods, systems, and apparatuses for implementing faceplate-based wireless device functionality and wireless extension functionality.

In various embodiments, one or more antennas, a power adapter, and at least one processor may be attached to an inner surface of a faceplate configured to be attached to a wall. The one or more antennas may be electrically coupled to the power adapter and communicatively coupled to the at least one processor. Alternatively, a wireless functionality device might include one or more antennas, a power adapter, and at least one processor. The wireless functionality device may be attached to an inner surface of a faceplate configured to be attached to a wall. The one or more antennas of the wireless functionality device may be electrically coupled to the power adapter and communicatively coupled to the at least one processor.

In operation, the one or more antennas and/or the wireless functionality device may be powered using the power adapter electrically coupled to the one or more antennas and the at least one processor. When the one or more antennas and/or the wireless functionality device initially receive power, and/or when the at least one processor receives a user input requesting that the one or more antennas connect to a network, the at least one processor communicatively coupled to the one or more antennas might connect the one or more antennas to the network. The at least one processor might then cause the one or more antennas and/or the wireless functionality device to perform at least one of transmitting or receiving one or more signals to perform one or more functions.

The various embodiments address issues with conventional wireless devices and wireless extension devices that either plug into electrical wall outlets or have one or more wires extending from the electrical wall outlets. By attaching the one or more antennas and/or the wireless functionality device to an inner surface of a faceplate configured to be attached to a wall, the one or more antennas may be disposed on an interior of the wall of a customer premises and invisible to a person standing on the exterior side of the wall within the customer premises. Thus, the one or more antennas would blend aesthetically within a customer premises because they would not be visible to a person within the customer premises. The one or more antennas would only be visible when the faceplate was removed from the wall of the customer premises. These and other aspects of the one or more antennas and/or the wireless functionality device are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, customer premises technology, wireless technology, wireless extension functionality, gateway technology, user interface technology, and/or the like. In other aspects, certain embodiments, can improve the functioning of user equipment or systems themselves (e.g., customer premises devices, wireless devices, wireless extension devices, gateway devices, user interface devices, etc.), for example, by powering, using a power adapter, one or more antennas, wherein the power adapter is electrically coupled to the one or more antennas, and wherein the one or more antennas are attached to an inner surface of a faceplate configured to be attached to a wall; connecting, using at least one processor communicatively coupled to the one or more antennas, the one or more antennas to a network; and causing, using the at least one processor, the one or more antennas to perform at least one of transmitting or receiving one or more signals to perform one or more functions; and/or the like. In particular, to the extent any abstract concepts are present in the various embodiments, those concepts can be implemented as described herein by devices, software, systems, and methods that involve specific novel functionality (e.g., steps or operations), such as, powering, using a power adapter, one or more antennas, wherein the power adapter is electrically coupled to the one or more antennas, and wherein the one or more antennas are attached to an inner surface of a faceplate configured to be attached to a wall; connecting, using at least one processor communicatively coupled to the one or more antennas, the one or more antennas to a network; and causing, using the at least one processor, the one or more antennas to perform at least one of transmitting or receiving one or more signals to perform one or more functions; and/or the like, to name a few examples, that extend beyond mere conventional computer processing operations. These functionalities can produce tangible results outside of the implementing computer system, including, merely by way of example, a wireless functionality device that can be attached to an inner surface of a faceplate and provide wireless communications, and/or the like, at least some of which may be observed or measured by customers and/or service providers.

In an aspect, a method might comprise powering, using a power adapter, one or more antennas, wherein the power adapter is electrically coupled to the one or more antennas, and wherein the one or more antennas are attached to an inner surface of a faceplate configured to be attached to a wall; connecting, using at least one processor communicatively coupled to the one or more antennas, the one or more antennas to a network; and causing, using the at least one processor, the one or more antennas to perform at least one of transmitting or receiving one or more signals to perform one or more functions.

In some embodiments, the faceplate includes at least one of a wall faceplate, a power outlet faceplate, a data connection faceplate, an Ethernet connection faceplate, a coaxial cable connection faceplate, a light switch faceplate, an audio connection faceplate, a video connection faceplate, or a multi-function faceplate.

According to some embodiments, the one or more antennas may be embedded within the inner surface of the faceplate.

In some embodiments, the one or more signals comprise at least one of one or more radio communications signals, WiFi communications signals, one or more cellular communications signals, or one or more Bluetooth communications signals. According to some embodiments, performing the one or more first functions might comprise at least one of: performing wireless access point functionality; performing wireless communications functionality; performing cellular communications functionality; performing Bluetooth communications functionality; performing Ethernet communications functionality; WiFi extension functionality; cellular extension functionality; Bluetooth extension functionality; or performing WiFi mesh functionality; and/or the like.

In some embodiments, the one or more antennas may be communicatively coupled to an Ethernet connection. In various instances, the one or more antennas may further be configured to perform at least one of transmitting the one or more signals to the Ethernet connection or receiving the one or more signals from the Ethernet connection. The Ethernet connection may be at least one of an Ethernet port, one or more Ethernet cables disposed in the wall, or one or more Ethernet wires disposed in the wall, and/or the like.

According to some embodiments, the one or more antennas or the at least one processor, via the one or more antennas, is at least one of: communicatively coupled to one or more user devices via a first wired connection; communicatively coupled to the one or more user devices via a first wireless connection; communicatively coupled to at least one of a router or a gateway device via a second wired connection; communicatively coupled to at least one of the router or the gateway device via a second wireless connection; communicatively coupled to the one or more user devices via a third wired connection and communicatively coupled to at least one of the router or the gateway device via a fourth wired connection; communicatively coupled to the one or more user devices via a third wireless connection and communicatively coupled to at least one of the router or the gateway device via a fourth wireless connection; communicatively coupled to the one or more user devices via a fifth wireless connection and communicatively coupled to at least one of the router or the gateway device via a fifth wired connection; or communicatively coupled to the one or more user devices via a sixth wired connection and communicatively coupled to at least one of the router or the gateway device via a sixth wireless connection; and/or the like.

In some embodiments, the method might further include receiving, with the at least one processor, a user input via a sync button disposed on the faceplate; and syncing, with the at least one processor, the one or more antennas with the network in response to receiving the user input via the sync button. In other embodiments, the method might include receiving, with the at least one processor, a user input via a sync button disposed on the faceplate; in response to receiving the user input via the sync button, sending, with the at least one processor, an initialization message to at least one of a user device or a software application ("app") running on the user device to sync the one or more antennas with the network; receiving, with the user device or the app running on the user device, a response to the initialization message; and in response to receiving the response to the initialization message, syncing, with the user device or the app running on the user device, the one or more antennas with the network.

According to some embodiments, one or more indicator lights may be attached to the faceplate. The one or more indicator lights may be located on at least one of a front face of the faceplate or an edge of the faceplate. The one or more indicator lights may be configured to indicate at least one of: whether the one or more antennas are receiving power; whether the one or more antennas are powered on or off; a signal strength of the one or more signals; a bandwidth availability of the one or more antennas; or a detection of motion in front of the faceplate; and/or the like.

In another aspect, an apparatus might comprise a faceplate configured to be attached to a wall; one or more antennas attached to an inner surface of the faceplate and configured to perform at least one of transmitting or receiving one or more signals to perform one or more functions; a power adapter electrically coupled to the one or more antennas and configured to provide power to the one or more antennas; at least one processor communicatively coupled to the one or more antennas; and a non-transitory computer readable medium communicatively coupled to the at least one processor. The non-transitory computer readable medium might have stored thereon computer software comprising a set of instructions that, when executed by the at least one processor, causes the apparatus to: connect the one or more antennas to a network; and cause the one or more antennas to perform the one or more functions.

In some embodiments, the faceplate comprises at least one of a wall faceplate, a power outlet faceplate, a data connection faceplate, an Ethernet connection faceplate, a coaxial cable connection faceplate, a light switch faceplate, an audio connection plate, a video connection faceplate, or a multi-function faceplate.

According to some embodiments, the one or more antennas may be embedded within the inner surface of the faceplate. In some cases, the power adapter may be electrically coupled to a power source. The power source may be at least one of a battery, an electrical wall outlet, a solar cell, or one or more electrical power wires disposed in the wall, and/or the like.

In some embodiments, the one or more signals comprise at least one of one or more radio communications signals, one or more WiFi communications signals, one or more cellular communications signals, or one or more Bluetooth communications signals. According to some embodiments, performing the one or more first functions might comprise at least one of: performing wireless access point functionality; performing wireless communications functionality; performing cellular communications functionality; performing Bluetooth communications functionality; performing Ethernet communications functionality; WiFi extension functionality; cellular extension functionality; Bluetooth extension functionality; or performing WiFi mesh functionality; and/or the like.

According to some embodiments, the one or more antennas or the at least one processor, via the one or more antennas, may be at least one of: communicatively coupled to one or more user devices via a first wired connection; communicatively coupled to the one or more user devices via a first wireless connection; communicatively coupled to at least one of a router or a gateway device via a second wired connection; communicatively coupled to at least one of the router or the gateway device via a second wireless connection; communicatively coupled to the one or more user devices via a third wired connection and communicatively coupled to at least one of the router or the gateway device via a fourth wired connection; communicatively coupled to the one or more user devices via a third wireless connection and communicatively coupled to at least one of the router or the gateway device via a fourth wireless connection; communicatively coupled to the one or more user devices via a fifth wireless connection and communicatively coupled to at least one of the router or the gateway device via a fifth wired connection; or communicatively coupled to the one or more user devices via a sixth wired connection and communicatively coupled to at least one of the router or the gateway device via a sixth wireless connection; and/or the like.

In yet another aspect, a system might comprise a plurality of wireless functionality devices. Each wireless functionality device might comprise a faceplate configured to be attached to a wall; one or more antennas attached to an inner surface of the faceplate and configured to perform at least one of transmitting or receiving one or more signals to perform one or more functions; a power adapter electrically coupled to the one or more antennas and configured to provide power to the one or more antennas; at least one processor communicatively coupled to the one or more antennas; and a non-transitory computer readable medium communicatively coupled to the at least one processor. The non-transitory computer readable medium might have stored thereon computer software comprising a set of instructions that, when executed by the at least one processor, causes said wireless functionality device to: connect the one or more antennas to a network; and cause the one or more antennas to perform the one or more functions.

In some embodiments, the plurality of wireless functionality devices is communicatively coupled together to form a mesh network. In some cases, the mesh network may be a WiFi mesh network.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing wireless functionality, and, more particularly, to methods, systems, and apparatuses for implementing faceplate-based wireless device functionality and wireless extension functionality, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing faceplate-based wireless device functionality, in accordance with various embodiments.

In the non-limiting embodiment of FIG. 1, system 100 might comprise one or more wireless functionality devices 105a-105c (collectively, wireless functionality devices 105) attached to an inner surface of a corresponding faceplate 115a-115c (collectively, faceplates 115). Although three wireless functionality devices 105a-105c are shown in FIG. 1, the different embodiments should not be limited to only three wireless functionality devices 105a-105c. There could be more or less wireless functionality devices 105a-105c depending on the situation.

The one or more wireless functionality devices 105 (examples of which are shown in, and described below with respect to, FIGS. 2A-2P) might each include, without limitation, at least one of a processor 110a, one or more antennas or wireless communications systems 110b, a data store 110c (optional), one or more displays or display screens 110d (optional), one or more sensors 110e (optional), one or more user interface(s) 110f (optional), a power adapter 110g, a power source 110h (optional), and/or the like.

In some instances, the one or more antennas and/or wireless communications systems 110b might include, but are not limited to, at least one of one or more WiFi antennas, one or more cellular antennas, or one or more Bluetooth antennas, and/or any combination of these and/or other antennas, and/or the like. The one or more antennas 110b may further be configured to provide wireless access point ("WAP") functionality, wireless communications functionality, cellular communications functionality, Bluetooth communications functionality, Ethernet communications functionality, WiFi extension functionality, cellular extension functionality, Bluetooth extension functionality, or WiFi mesh functionality, and/or the like. In some cases, the one or more display screens 110d may be configured to be displayed on an outer surface of the one or more faceplates 115 and might each include, but are not limited to, at least one of a liquid crystal display ("LCD") screen, a light emitting diode ("LED") display screen, an organic LED ("OLED") display screen, a quantum dot LED ("QLED") display screen, or a touchscreen display screen, and/or the like. In some instances, the one or more sensors 110e might each include, without limitation, at least one of a light sensor, a proximity sensor, a motion sensor, or an audio sensor, and/or the like. In some embodiments, the one or more user interfaces 110f might include, but are not limited to, at least one of one or more physical buttons, one or more soft or virtual (touchscreen) buttons, one or more touchscreen interfaces, or one or more voice interfaces, one or more lights or light interfaces, and/or the like. In some instances, the power adapter 110g might convert (or transform) electricity (i.e., by regulating voltage, stepping-up or stepping down voltage, limiting current, etc.) that is transmitted to the wireless functionality device 105 from a power source 110h. The power source 110 might be integrated into the wireless functionality device 105 or separate from the wireless functionality device 105. The power source 110 might be, without limitation, a battery, an electrical wall outlet, a solar cell, or one or more electrical power wires disposed in the wall 120, and/or the like. In some cases, by wiring the wireless functionality device 105 to the one or more electrical power wires disposed in the wall 120, the one or more antennas 110b may be configured to transmit communications signals or receive communications signals over powerline.

In various cases, the at least one processor 110a may be communicatively coupled to the one or more antennas or wireless communications systems 110b, the data store 110c, the one or more displays or display screens 110d, the one or more sensors 110e, the one or more user interface(s) 110f, the power adapter 110g, the power source 110h, and/or the like. In some instances, the power adapter 110g and/or the power source 110h may be electrically coupled to and provide power to the at least one processor 110a, the one or more antennas or wireless communications systems 110b, the data store 110c, the one or more displays or display screens 110d, the one or more sensors 110e, the one or more user interface(s) 110f, the power adapter 110g, the power source 110h, and/or the like.

In various instances, the one or more faceplates 115 may include, without limitation, one or more wall faceplates, one or more power outlet faceplates, one or more data connection faceplates, one or more Ethernet connection faceplates, one or more coaxial cable connection faceplates, one or more light switch faceplates, one or more audio connection faceplates, one or more video connection faceplates, or one or more multi-function faceplates, and or the like. The one or more multi-function faceplates may be a faceplate combining features of two or more of the other faceplates. In a non-limiting example, the one or more multi-function faceplates may include two or more features of a wall faceplate, a power outlet faceplate, a data connection faceplate, an Ethernet connection faceplate, a coaxial cable connection faceplate, a light switch faceplate, an audio connection faceplate, a video connection faceplate, and/or the like.

In some cases, system 100 might further include one or more walls 120 (where the one or more faceplates 115 are configured to be attached to the one or more walls 120). The one or more faceplates 115 may be detachably attached to the one or more walls 120 via glue, one or more screws, and/or the like. An inner surface of the one or more faceplates 115 may be hidden within an interior of walls 120 such that an inner surface of the one or more faceplates 115 is not visible to a person standing on the outside of walls 120.

In some instances, system 100 might additionally include one or more user devices 125a-125c (collectively, user devices 125) and a gateway or a router 130 (e.g., a G.hn gateway, or the like). Each of the wireless functionality devices 105, faceplates 115, walls 120, user devices 125, and/or gateways or routers 130 may be disposed in one or more rooms 135a-135c of a customer premises 135. According to some embodiments, the one or more user devices 125 might include, without limitation, at least one of a laptop computer, a tablet computer, a smart phone, a mobile phone, a personal digital assistant, a remote control device, a portable gaming device, a television set, a smart television, a computer monitor, a laptop monitor, a set-top box ("STB"), a gaming console, a digital video recorder ("DVR"), a media playback and/or recording device, an Internet of Things ("IoT") device, a kitchen appliance, or a home appliance, and/or the like.

The one or more user devices 125 and/or gateway 130 might communicatively couple to the one or more of the wireless functionality devices 105 via the one or more antennas 110b. Additionally and/or alternatively, the wireless functionality devices 105a-105c might communicatively couple together via the one or more antennas 110b. In some instances, the wireless functionality devices 105, user devices 125, and/or gateway 130 may be communicatively coupled together within network(s) 140. Network(s) 140 may include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a cellular network; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks.

According to some embodiments, the wireless functionality device 105, the one or more antennas 110b, or the at least one processor 110a, via the one or more antennas 110b, is at least one of: communicatively coupled to one or more user devices 125 or other wireless functionality devices 105 via a wired connection; communicatively coupled to the one or more user devices 125 or other wireless functionality devices 105 via a wireless connection; communicatively coupled to the gateway 130 via a wired connection; communicatively coupled to the gateway 130 via a wireless connection; communicatively coupled to the one or more user devices 125 or other wireless functionality devices 105 via a wired connection and communicatively coupled to the gateway 130 via a wired connection; communicatively coupled to the one or more user devices 125 or other wireless functionality devices 105 via a wireless connection and communicatively coupled to the gateway 130 via a wireless connection; communicatively coupled to the one or more user devices 125 or other wireless functionality devices 105 via a wireless connection and communicatively coupled to at least one of the gateway 130 via a wired connection; or communicatively coupled to the one or more user devices 125 or other wireless functionality devices 105 via a wired connection and communicatively coupled to the gateway 130 via a wireless connection; and/or the like.

In a non-limiting example, the wireless functionality device 105, the one or more antennas 110b, or the at least one processor 110a, via the one or more antennas 110b, may be communicatively coupled to the one or more user devices 125 via a wired Ethernet connection and communicatively coupled to the gateway 130 via a wireless WiFi connection. Alternatively, in other cases, the wireless functionality device 105, the one or more antennas 110b, or the at least one processor 110a, via the one or more antennas 110b, may be communicatively coupled to the one or more user devices 125 via a wireless WiFi connection and communicatively coupled to at least one of the gateway 130 via a wired Ethernet connection. In another non-limiting example, the wireless functionality device 105, the one or more antennas 110b, or the at least one processor 110a, via the one or more antennas 110b, may be communicatively coupled to the one or more user devices 125 via a wireless WiFi connection and communicatively coupled to the gateway 130 via a wired data over powerline connection. Alternatively, in other cases, the wireless functionality device 105, the one or more antennas 110b, or the at least one processor 110a, via the one or more antennas 110b, may be communicatively coupled to the one or more user devices 125 via a wired Ethernet connection and communicatively coupled to at least one of the gateway 130 via a wired data over powerline connection.

In some instances, the wireless functionality device 105a may be a main wireless functionality device and may be installed in a faceplate 115a (e.g., an electrical outlet faceplate, and/or the like) located near gateway 130 and coupled to the gateway 130 via an Ethernet connection. By installing the main wireless functionality device 105a near, or in physical proximity to, gateway 130 and coupling the main wireless functionality device 105a to the gateway 130 via an Ethernet connection, a more stable WiFi mesh network may be created by using Ethernet backhaul. Alternatively, if the wireless functionality device 105a is not installed near, or in physical proximity to, the gateway 130, the wireless functionality device 105a-105c may provide a tri-band WiFi system and use a dedicated radio for backhaul.

In some embodiments, system 100 might further comprise a computing system 145 (optional) and corresponding database(s) 150 (optional) that may communicatively couple to the gateway 130 (e.g., a G.hn gateway, or the like) via network(s) 155 or communicatively couple to one or more wireless functionality devices 105 via the one or more antennas 110b, via the gateway 130, and via network(s) 155. Network(s) 155 can include a wide-area network ("WAN"); a wireless wide area network ("WWAN"); a virtual network, such as a virtual private network ("VPN"); the Internet; an intranet; an extranet; a cellular network; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network 155 might include a core network of the service provider, and/or the Internet.

In operation, the wireless functionality device 105 including the at least one processor 110a, the one or more antennas 110b, and/or the power adapter 110g might be attached to an inner surface of a faceplate 115 that is configured to be attached to a wall 120. In some cases, the wireless functionality device might further include optional data store 110c, optional display 110d, optional sensors 110e, optional user interfaces 110f, and/or optional power source 110h. In various instances, the least one processor 110a, the one or more antennas 110b, and/or the power adapter 110g may be integrated into one housing of the wireless functionality device 105. Alternatively, the least one processor 110a, the one or more antennas 110b, and/or the power adapter 110g of the wireless functionality device 105 may be attached to the faceplate 115 as multiple separate parts. By attaching the wireless functionality device 105 to an inner surface of a faceplate 115, the wireless functionality device 105 may be fully contained within a wall 120 of a customer premises 135 and not visible to a person within the customer premises 135. Only an outer surface of the face plate 115a may be visible to a person within the customer premises 135 unless the faceplate 115 is removed from the wall 120.

In some cases, the wireless functionality device 105 may be attached to the inner surface of the faceplate 115 via a least one of a resin, a glue, one or more screws, and/or the like. In some instances, the wireless functionality device 105 may be fully embedded or partially embedded within the faceplate 115. In a non-limiting example, the faceplate 115 may be 3D-printed around the wireless functionality device 105 to embed the wireless functionality device 105 within the faceplate 115.

In some embodiments, the wireless functionality device 105 might be powered using the power adapter 110g electrically coupled to a power source 110h. In some instances, the power adapter 110g might convert electricity that is transmitted to the wireless functionality device 105 and/or the one or more antennas 110b from a power source 110h. In some instances, the wireless functionality device 105 may be wired directly into one or more power wires disposed in wall 120 of the customer premises. In various cases, the power adapter 110g may be electrically coupled to multiple power sources 110h. For example, the power adapter 110g may be electrically coupled to both a battery and one or more electrical power wires disposed in the wall 120. The battery may serve as a backup if power to the one or more electrical power wires disposed in the wall 120 goes out during a power outage and ensure that the wireless functionality device 105 and/or the one or more antennas 110b always receive power.

Once the wireless functionality device 105 is powered, the processor 110a communicatively coupled to the one or more antennas 110b of the wireless functionality device 105 may connect the wireless functionality device 105 and/or the one or more antennas 110b to network 140 and/or network 155. In some cases, in order to connect the wireless functionality device 105 and/or the one or more antennas 110b to network 140 and/or network 155, the at least one processor may automatically sync the wireless functionality device 105 and/or the one or more antennas 110b to network 140 and/or network 155 or manually sync the wireless functionality device 105 and/or the one or more antennas 110b to network 140 and/or network 155 in response to user input.

In some cases, the at least one processor 110a may automatically sync the wireless functionality device 105 and/or the one or more antennas 110b by determining whether the wireless functionality device 105 and/or the one or more antennas 110b have received power. Based on a determination that the wireless functionality device 105 and/or the one or more antennas 110b have received power, the at least one processor 110a may automatically sync and connect the wireless functionality device 105 to network 140 and/or network 155.

In other cases, the at least one processor 110a may receive user input via the display(s) 110d and/or user interface(s) 110f, requesting that the processor 110a sync and connect the wireless functionality device 105 to network 140 and/or network 155. In response to receiving the user input, the at least one processor 110a may sync and connect the wireless functionality device 105 to network 140 and/or network 155. In some cases, display(s) 110d and/or user interface(s) 110f might comprise a sync button and the user input may be received via the sync button. Additionally and/or alternatively, the user may press the sync button for a predetermined period of time to reset the wireless functionality device 105 and/or the one or more antennas 110b.

In yet another case, the at least one processor 110a may determine the wireless functionality device 105 and/or the one or more antennas 110b have received power. Alternatively, the at least one processor 110a may receive user input via the display(s) 110d and/or user interface(s) 110f, requesting that the processor 110a sync and connect the wireless functionality device 105 to network 140 and/or network 155. In response to determining the wireless functionality device 105 and/or the one or more antennas 110b have received power and/or in response to receiving the user input, the at least one processor 110a may send an initialization message to at least one of a user device 125 or a software application ("app") running on the user device 125 to sync the one or more antennas with network 140 and/or network 155. The initialization message may be sent to a nearby user device (e.g., a cellphone, a tablet, a computer, and/or the like) via a Bluetooth wireless connection and/or a WiFi wireless connection. The user device 125 may receive a response to the initialization message from the user and, in response to receiving the response to the initialization message, the user device 125 may sync and connect the wireless functionality device 105 to network 140 and/or network 155.

In some cases, if the processor 110a determines that the wireless functionality device 105 and/or one or more antennas 110b did not automatically sync and connect to network 140 and/or network 155, then the processor 110a may indicate on display 110d and/or via user interface 110f that the wireless functionality device 105 and/or one or more antennas 110b did not automatically sync and connect to network 140 and/or network 155. In a non-limiting example, a sync button located on faceplate 115 may flash a red light indicating that the wireless functionality device 105 and/or one or more antennas 110b did not automatically sync and connect to network 140 and/or network 155. The processor 110a may then wait to receive input via display 110d and/or via user interface 110f and, in response to receiving user input, the at least one processor 110a may try to sync and connect the wireless functionality device 105 to network 140 and/or network 155.

Alternatively, if the processor 110a determines that the wireless functionality device 105 and/or one or more antennas 110b did not automatically sync and connect to network 140 and/or network 155 and/or that user input via display 110d and/or via user interface 110f did not manually sync and connect to network 140 and/or network 155, the processor 110a may send an initialization message to at least one of the user device 125 or a software application ("app") running on the user device 125 to sync the one or more antennas with network 140 and/or network 155. The user device 125 may receive a response to the initialization message from the user and, in response to receiving the response to the initialization message, the user device 125 may sync the wireless functionality device 105 to network 140 and/or network 155.

Once the wireless functionality device 105 is connected to network 140 and/or network 155, the at least one processor 110a might cause the wireless functionality device 105 and/or the one or more antennas 110b to perform at least one of transmitting or receiving one or more signals to perform one or more functions. The one or more signals might include, without limitation, at least one of one or more radio communications signals, WiFi communications signals, one or more cellular communications signals, or one or more Bluetooth communications signals, and/or the like. According to some embodiments, performing the one or more first functions might comprise at least one of: performing wireless access point functionality; performing wireless communications functionality; performing cellular communications functionality; performing Bluetooth communications functionality; performing Ethernet communications functionality; WiFi extension functionality; cellular extension functionality; Bluetooth extension functionality; or performing WiFi mesh functionality; and/or the like. The wireless functionality device 105 may then act as a WiFi access point, a WiFi extension device, a cellular extension device, and/or the like.

In some instances, as each wireless functionality device 105a-105c is synced and connected to network 140, the network 140 expands and changes. For example, when a new wireless functionality device 105a-105c is added to network 140, the network 140 may add and change routes for transmitting and receiving the one or more signals. Additionally, in the cases where the one or more signals are WiFi communications signals, WiFi in a customer premises can be extended and a WiFi mesh network can be created.

According to some embodiments, the user device 125 and/or computing system 145 might collect and store data locally or at database 150 from the one or more wireless functionality devices 105. For example, user device 125 and/or computing system 145 might collect and store a location (e.g., the rooms where the wireless functionality devices 105 are located) associated with each wireless functionality device 105, a signal strength of each wireless functionality device 105, an available bandwidth associated with each wireless functionality device 105, a powered status (e.g., powered on or powered off) associated with each wireless functionality device 105, a number of devices connected to the each wireless functionality device 105, types of devices connected to each wireless functionality device 105, specific devices (e.g., living room TV, refrigerator, and/or the like) connected to each wireless functionality device 105, a download speed or an upload speed associated with each wireless functionality device 105, and/or the like.

In various cases, the display 110d and/or user interface 110f might include one or more indicator lights. The one or more indicator lights might be attached to an outer surface of the faceplate 115 and/or attached to an edge of faceplate 115. The display 110d, user interface 110f, and/or one or more indicator lights may be configured to indicate at least one of: whether the one or more antennas are receiving power; whether the one or more antennas are powered on or off; a signal strength of the one or more signals; a bandwidth availability of the one or more antennas; or a detection of motion in front of the faceplate; and/or the like. In a few non-limiting examples, the one or more indicator lights may be green when the one or more antennas are receiving power and/or when the one or more antennas are powered on. The one or more indicator lights may be off when the one or more antennas are powered off. A number of indicator lights turned on or a color of indicator lights may indicate a signal strength of the one or more signals. For example, four indicator lights turned on or green indicator lights may indicate that strong signal strength while one indicator light turned on or red indicator lights may indicate low signal strength. In some cases, the one or more indicator lights may be powered on when the one or more sensors 110e detect motion and/or when the one or more sensors 110e detect that one or more lights in a room have been powered off.

In various embodiments, the one or more sensors 110e of the wireless functionality device 105 might include microphones and/or speakers. If the one or more sensors 110e include microphones and/or speakers, the wireless functionality device 105 might be configured as a smart home assistant or hub (e.g., an echo, a google home, and/or the like) and used to control one or more user devices 125 and/or the like.

These and other functions of the system 100 (and its components) are described in greater detail below with respect to FIGS. 2-5.

Figure 2A:
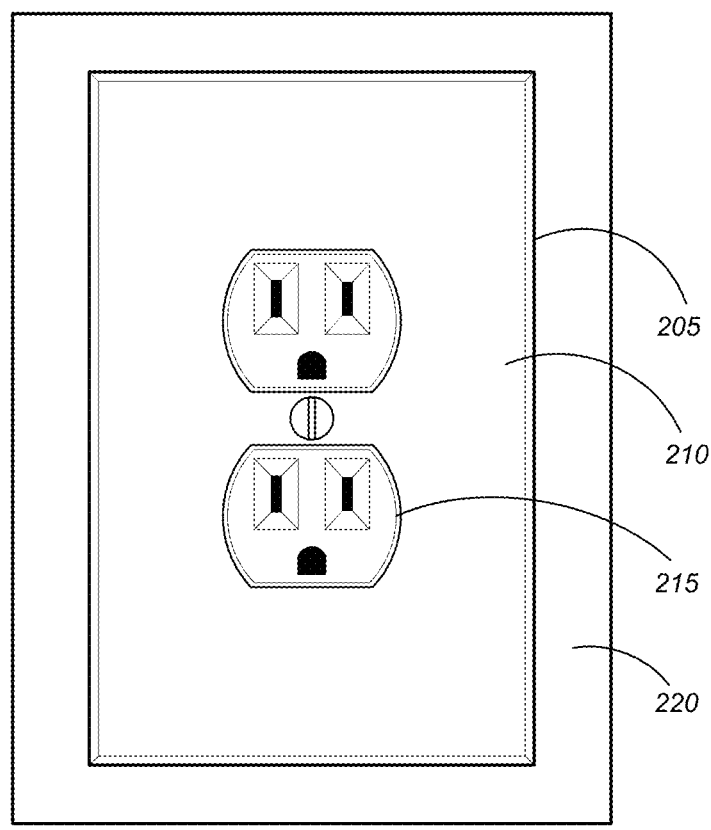
FIGS. 2A-2P are schematic diagrams illustrating non-limiting examples of various views and implementations of faceplates and faceplate-based wireless functionality devices that are configured to attach to an inner surface of the faceplates, in accordance with various embodiments.

FIGS. 2A-2P (collectively, "FIG. 2") are schematic diagrams illustrating non-limiting examples 200, 200', 200", and 200''' of various views and implementations of faceplates and wireless functionality devices that are configured to attach to an inner surface of the faceplates, in accordance with various embodiments. FIGS. 2A-2M depict a first example 200 of a faceplate 205 and wireless functionality devices that are configured to attach to an inner surface of the faceplate 205. Although electrical outlet faceplates 205 are shown in FIGS. 2A-2M, the faceplate 205 could be any other type of faceplate, including, but not limited to, one of a wall faceplate, a power outlet faceplate, a data connection faceplate, an Ethernet connection faceplate, a coaxial cable connection faceplate, a light switch faceplate, an audio connection plate, a video connection faceplate, or a multi-function faceplate, and or the like. The multi-function faceplate may be a faceplate combining features of two or more of the other faceplates. In a non-limiting example, the one or more multi-function faceplates may include two or more features of a wall faceplate, a power outlet faceplate, a data connection faceplate, an Ethernet connection faceplate, a coaxial cable connection faceplate, a light switch faceplate, an audio connection faceplate, a video connection faceplate, and/or the like. Further, although a Type B plug and socket is shown in FIGS. 2A-2M, the various embodiments are not so limited, and any suitable plug and socket may be used, including, but not limited to, one of Type A, Type B, Type C, Type D, Type E, Type F, Type G, Type H, Type I, Type J, Type K, Type L, Type M, Type N, or Type O, or the like, which may be dependent on which country or region the faceplate 205 and/or wireless functionality device is intended to be used. FIGS. 2N-2P depict a second example 200', a third example 200", and a fourth example 200''' of various other implementations of faceplates and wireless functionality devices that are configured to attach to an inner surface of the faceplates.

Figure 2B:
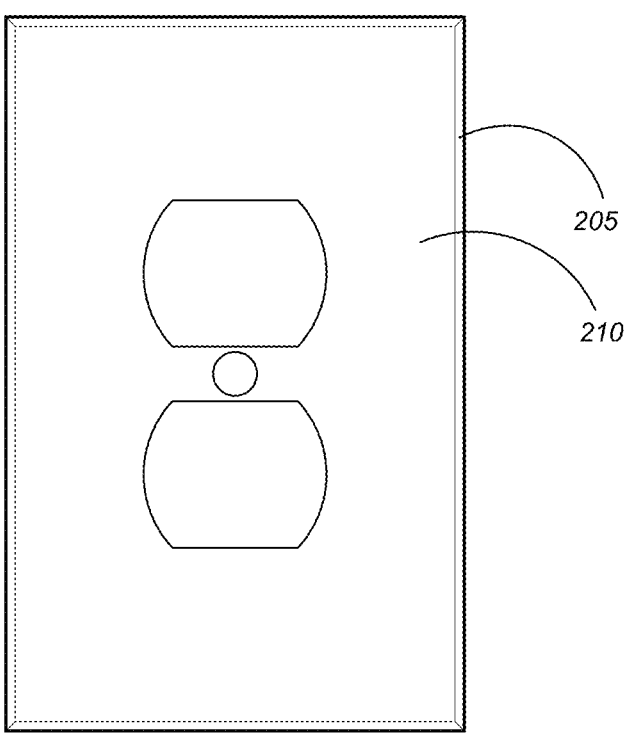

With reference to FIG. 2A, a first example 200 of a front view of a faceplate 205 with an outer surface 210 is shown. The faceplate 205 is an electrical outlet faceplate with a Type B plug and socket 215 and the faceplate 205 is attached to wall 220. With reference to FIG. 2B, a front view of the faceplate 205 having an outer surface 210 is shown without a plug and socket and without being attached to wall 220.

Figure 2C:
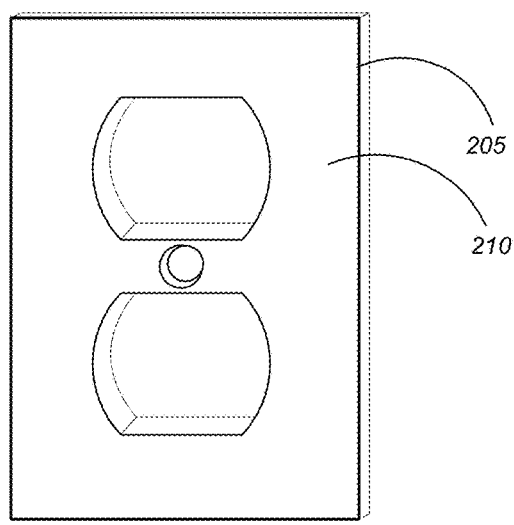
Figure 2D:
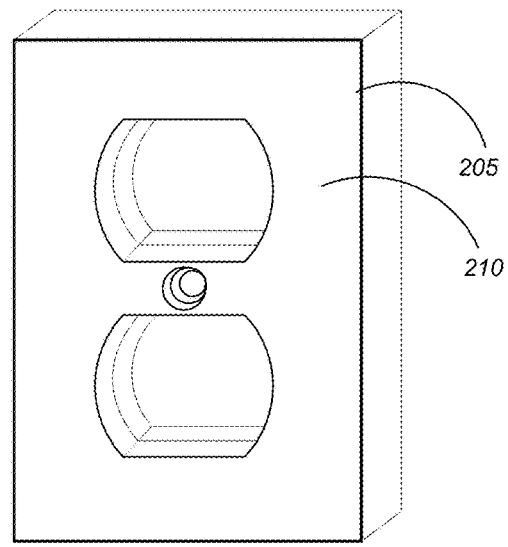
Figure 2E:
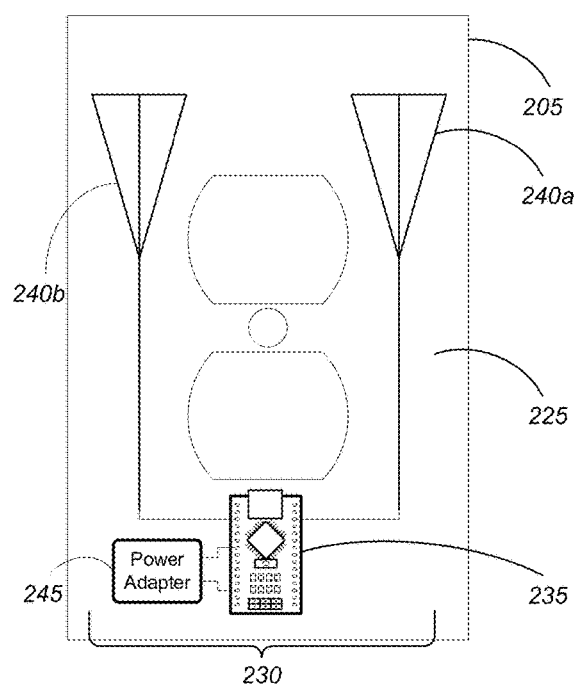

With reference to FIGS. 2C and 2D, the faceplate 205 is shown as having multiple different thicknesses to accommodate multiple different wireless functionality device(s) 230 (not shown in FIGS. 2B and 2C) of various sizes and thicknesses. For example, the thickness of faceplate 205 may be thinner when the wireless functionality device is attached to the inner surface 225 of the faceplate 205 via a least one of a resin, a glue, one or more screws, and/or the like. In some instances, the thickness of faceplate 205 may be thicker when the wireless functionality device 230 is fully embedded or partially embedded within the faceplate 205. In a non-limiting example, the faceplate 205 may be 3D-printed around the wireless functionality device 230 to embed the wireless functionality device 230 within the faceplate 205.

With reference to FIGS. 2E-2L, FIGS. 2E-2L show a rear view of a faceplate 205 with different embodiments of wireless functionality devices 230 attached to the inner surface 225 of the faceplate 205. The wireless functionality devices 230 might each include, without limitation, at least one of a processor 235, one or more antennas or wireless communications systems 240, and a power adapter 245. In various cases, the at least one processor 235 may be communicatively coupled to the one or more antennas 240 and/or the power adapter 245, and/or the like. In some instances, the power adapter 245 may be electrically coupled to and provide power to the at least one processor 235, the one or more antennas 240, and/or the like.

In some instances, the one or more antennas and/or wireless communications systems 240 might include, but are not limited to, at least one of one or more WiFi antennas, one or more cellular antennas, or one or more Bluetooth antennas, and/or any combination of these and/or other antennas, and/or the like. The one or more antennas 240 may further be configured to transmit or receive one to more signals.

Figure 2F:
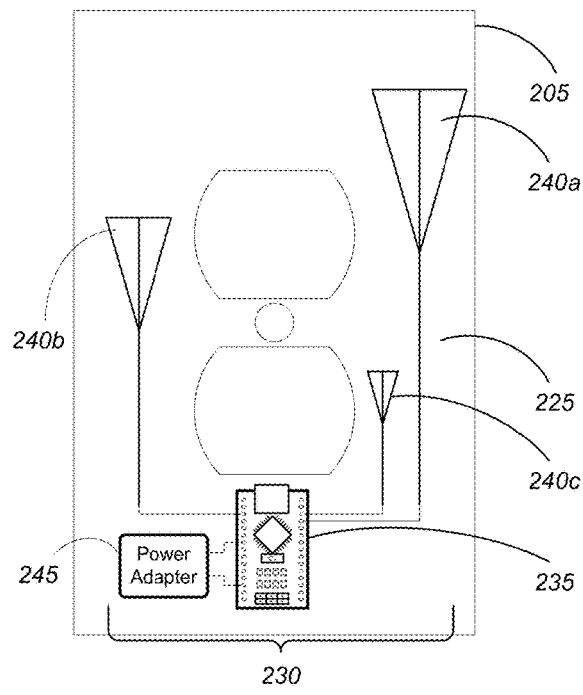

In some instances, as shown in FIG. 2F, there may be three antennas 240a-240c. In some cases, antenna 240a may be a first rf antenna, antenna 240b may be a second rf antenna, and antenna 240c may be a third rf antenna. The first rf antenna, the second rf antenna, and the third rf antenna (collectively, "rf antennas" or the like) might communicatively couple to another of the first rf antenna, the second rf antenna, and the third rf antenna. Each of the first rf antenna, the second rf antenna, and/or the third rf antenna may operate at different frequency ranges. Merely by way of example, in some cases, the first operating frequency range might center around 5 GHz (with frequency bandwidth ranging from 10 Hz to 500 MHz or the like), while the second operating frequency range might center around 2.4 GHz (with frequency bandwidth ranging from 10 Hz to 500 MHz or the like), and the third operating frequency range might center around 900 MHz (with frequency bandwidth ranging from 10 Hz to 100 MHz or the like. The one or more antennas 240 may further be configured to provide wireless access point ("WAP") functionality, wireless communications functionality, cellular communications functionality, Bluetooth communications functionality, Ethernet communications functionality, WiFi extension functionality, cellular extension functionality, Bluetooth extension functionality, or WiFi mesh functionality, and/or the like.

In some embodiments, the wireless functionality device 230 might further include a power source 250 as shown in FIGS. 2G and 2H. In FIG. 2G, the power source is a battery 250a and, in FIG. 2H, the power source 250 is one or more electrical wires 250b disposed in wall 220. In FIG. 2H, the wireless functionality device 230 is wired directly to the one or more wires disposed in wall 220. The power source 250 may be electrically coupled to the power adapter 245 and provide power to the at least one processor 235 and/or the one or more antennas 240. In some cases, by wiring the wireless functionality device 105 to the one or more electrical power wires 250b disposed in the wall 120, the one or more antennas 110b may be configured to transmit signals or receive signals over the one or more electrical power wires 250b disposed in the wall 220.

In various instances, the power adapter 245 may be electrically coupled to both a battery 250a and one or more electrical power wires 250b disposed in the wall 220. The battery 250a may serve as a backup if power to the one or more electrical power wires 250b disposed in the wall 220 goes out during a power outage. This ensures that the one or more antennas 240 always receive power. Additionally, in some instances, when the router or gateway of a customer premises have one or more battery backups and when the wireless functionality devices are configured as WiFi extension devices, then WiFi within a customer premises may continue to function within a customer premises even during a power outage due to the battery 250a backup.

Figure 2J:
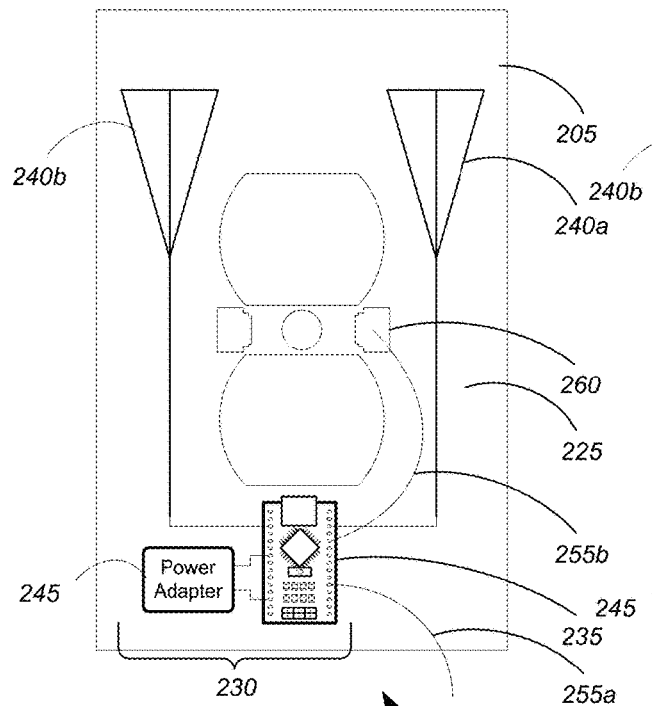
Figure 2K:
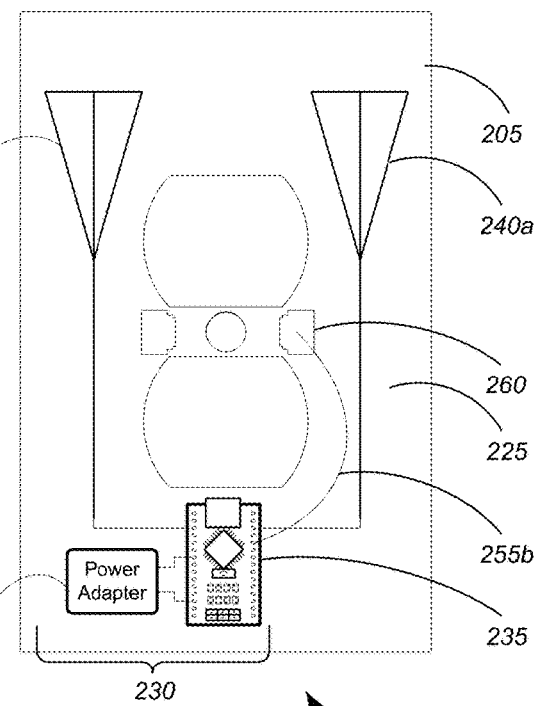

In various embodiments, the wireless functionality device 230 and/or the one or more antennas 240 might further be connected to one or more Ethernet lines 255 via an Ethernet connection as shown in FIGS. 2I-2K. The one or more antennas 240 may further be configured to perform at least one of transmitting the one or more signals to the Ethernet lines 255 or receiving the one or more signals from the Ethernet lines 255. The Ethernet connection may be at least one of an Ethernet port, one or more Ethernet cables disposed in the wall 220, or one or more Ethernet wires disposed in the wall.

In some cases, as shown in FIG. 2I, the wireless functionality device 230 and/or the one or more antennas 240 might further be connected to one or more Ethernet wires 255a disposed in the wall 220 of the customer premises. The wireless functionality device 230 may be wired directly to the one or more Ethernet wires 255a disposed in the wall 220 of the customer premises. The one or more antennas 240 might wirelessly transmit the one or more signals to one or more user devices from the one or more Ethernet wires 255a disposed in the wall 220 of the customer premises. Additionally, the one or more antennas 240 might wirelessly receive the one or more signals from one or more user devices and transmit the one or more signals to the one or more Ethernet wires 255a disposed in the wall 220 of the customer premises.

In other cases, as shown in FIG. 2J, the wireless functionality device 230 and/or the one or more antennas 240 might further be connected to one or more Ethernet wires 255a disposed in the wall 220 of the customer premises and one or more Ethernet ports 260 via one or more Ethernet wires or cables 255b. The one or more antennas 240 might transmit, from the one or more Ethernet wires 255a disposed in the wall 220 of the customer premises, one or more signals to one or more user devices via the Ethernet port 260. Additionally, the one or more antennas 240 might receive the one or more signals from one or more user devices via Ethernet port 260 and transmit the one or more signals to the one or more Ethernet wires 255a disposed in the wall 220 of the customer premises.

In yet other cases, as shown in FIG. 2K, the wireless functionality device 230 and/or the one or more antennas 240 might further be connected to one or more Ethernet ports 260 via one or more Ethernet wires or cables 255b. The one or more antennas 240 might wirelessly transmit from a gateway, a router, another wireless functionality device 230, and/or one or more user devices one or more signals to one or more user devices coupled to the Ethernet port 260 via the Ethernet port 260. Additionally, the one or more antennas 240 might receive the one or more signals from one or more user devices via Ethernet port 260 and wirelessly transmit the one or more signals to a gateway, a router, another wireless functionality device 230, and/or one or more user devices.

Figure 2L:
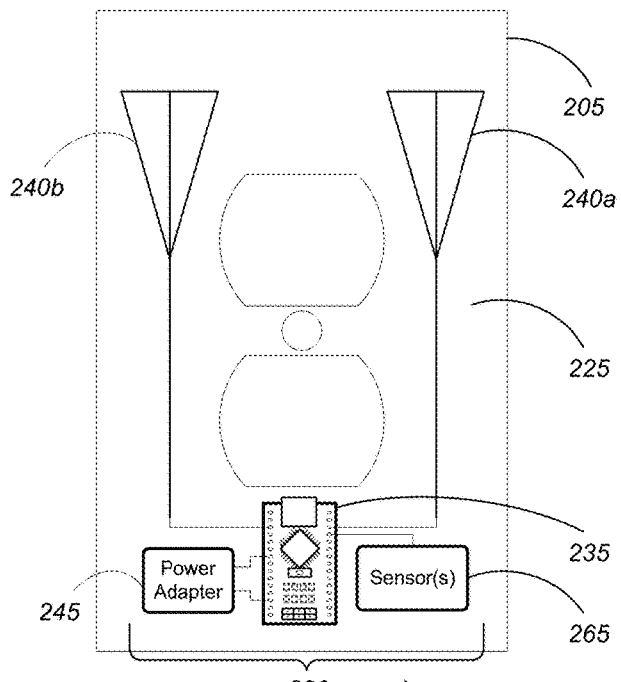
Figure 2M:
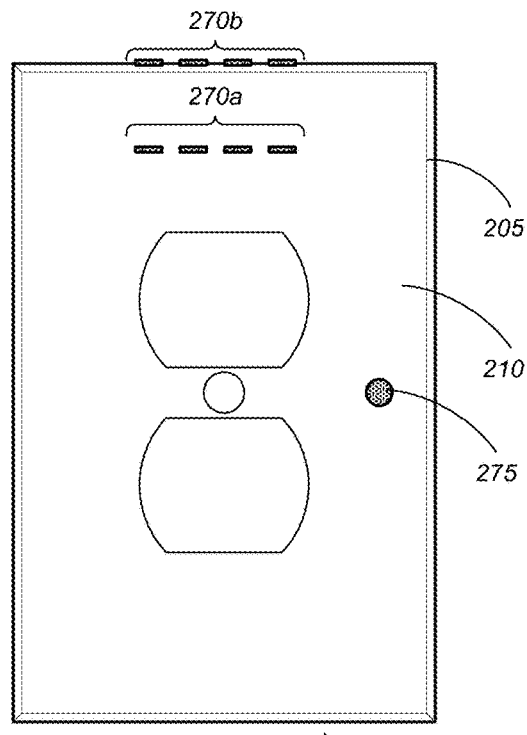

According to some embodiments, the wireless functionality device 230 might further comprise one or more sensors 265 as shown in FIG. 2L and the faceplate 205 might include one or more indicator lights 270 and/or one or more buttons 275 as shown in FIG. 2M. In some instances, the one or more sensors 265 might each include, without limitation, at least one of a light sensor, a proximity sensor, a motion sensor, or an audio sensor, and/or the like.

In various cases, the one or more indicator lights 270a might be attached to an outer surface of the faceplate 205 and/or the one or more indicator lights 270b might be attached to an edge of the faceplate 205. The one or more indicator lights 270 may be configured to indicate at least one of: whether the one or more antennas are receiving power; whether the one or more antennas are powered on or off; a signal strength of the one or more signals; a bandwidth availability of the one or more antennas; or a detection of motion in front of the faceplate; and/or the like. In a few non-limiting examples, the one or more indicator lights 270 may be green when the one or more antennas are receiving power and/or when the one or more antennas are powered on. The one or more indicator lights 270 may be off when the one or more antennas are powered off. A number of indicator lights 270 turned on or a color of indicator lights 270 may indicate a signal strength of the one or more signals. For example, four indicator lights turned on or green indicator lights may indicate that strong signal strength while one indicator light turned on or red indicator lights may indicate low signal strength. In some cases, the one or more indicator lights 270 may be powered on when the one or more sensors 265 detect motion and/or when the one or more sensors 265 detect that one or more lights in a room have been powered off.

In some embodiments, the one or more buttons 275 might include one or more sync buttons to manually sync the wireless functionality device 230 with a network. For example, the at least one processor 235 may receive user input via the one or more buttons 275, requesting that the processor 235 sync and connect the wireless functionality device 230 to a network. In response to receiving the user input, the at least one processor 235 may sync and connect the wireless functionality device 230 to the network. Additionally and/or alternatively, the user may press the button 275 for a predetermined period of time to reset the wireless functionality device 230 and/or the one or more antennas 240.

With reference to FIGS. 2N-2P, FIGS. 2N-2P depict a second example 200', a third example 200", and a fourth example 200'" of various other implementations of faceplates and/or wireless functionality devices that are configured to attach to an inner surface of the faceplates. For example, FIG. 2N represents the faceplate 205' as being a faceplate for one or more light switches, FIG. 2O represents the faceplate 205" as being a faceplate for one or more Ethernet connections, and FIG. 2P represents a multi-function faceplate 205'" for an audio connection and a video connection.

These and other functions of the wireless functionality device 230 (and its components) are described in greater detail above and below with respect to FIGS. 1, 3, 4, and 5.

FIGS. 3A-3D (collectively, "FIG. 3") are illustrations of one or more software applications ("apps") running on user devices 300 used by users to interact with one or more wireless functionality devices. The one or more apps present exemplary graphical user interfaces for implementing faceplate-based wireless device functionality, in accordance with various embodiments. In FIG. 3, each user device 300 might comprise a housing 305 and a display screen 310. Display screen 310 might include a touchscreen device, a non-touchscreen device, and/or a combination in which some portions are touchscreen-capable while other portions are not touchscreen-capable. In some embodiments, the user device 300 might serve as a device-aware touchscreen remote controller that changes the screen and user interface based on a determination of which device it is pointed at or associated with. For example, if the user device 300 is pointing at a first wireless functionality device, the user device might determine that it is pointing at the first wireless functionality device and the user interface might automatically change to present a first wireless functionality device remote controller user interface (either a universal remote controller user interface or a remote controller user interface that is specific to or otherwise customized for the particular first wireless functionality device it is pointing at, etc.). Although FIG. 3 depicts user device 300 as being a smart phone, the various embodiments are not so limited, and the user device 300 can be any suitable user device, including, but not limited to, a tablet computer, a smart phone, a mobile phone, a personal digital assistant, a fitness tracker, a smart watch, a laptop computer, a desktop computer, and/or the like.

FIG. 3A depicts a user interface for initializing and enabling a wireless functionality device, in accordance with various embodiments. FIG. 3B depicts a user interface that provides the user with information (including current, up-to-date information) regarding the wireless functionality devices within the customer premises. FIGS. 3C and 3D depict alternative user interfaces that allow the user to view a network of connected devices including the wireless functionality devices within the customer premises.

Turning to FIG. 3A, the user interface might comprise a header portion 310a that provides the user with options to return to a previous screen (i.e., "Back," or the like), provides the user with a title or summary of the currently displayed screen (e.g., "Initialization" etc.), and provides the user with options to indicate that the selections for the current screen are complete (i.e., "Done," or the like).

FIG. 3A depicts one or more user interface panels 315 that allow the user to initialize one or more wireless functionality devices, in accordance with various embodiments. For example, in response to a detection that a wireless functionality device has been powered and/or in response to a user interaction with a sync button on the wireless functionality device, the wireless functionality device might send an initialization message to at least one of the user device 300 or an app running on the user device 300 to sync the wireless functionality device with the network. Additionally and/or alternatively, the user device 300 and/or the app running on the user device 300 might detect that one or more wireless functionality devices have entered a customer premises and/or are trying to connect to a network of the customer premises. Based on a determination that one or more wireless functionality devices have entered a customer premises and/or are trying to connect to a network of the customer premises, the user device 300 and/or the app running on the user device 300 might display an initialization message to a user of the user device 300 to sync the wireless functionality device with the network.

In each sub-panel, the user may be provided with additional options (i.e., when the user selects the menu icon in each sub-panel, or the like). For example, in sub-panel 315a, the user device 300 may verify that a user wants to set up the wireless functionality device. In sub-panel 315b, a user may select a room where the wireless functionality device is located. Additionally and/or alternatively, by selecting a room where the wireless functionality device is located, the wireless functionality device may be set as the default wireless functionality device to use to transmit or receive one or more signal for one or more user devices located in the same room as wireless functionality device. In sub-panel 315c, after the wireless functionality device has been setup, the user device 300 may verify that a user wants to synchronize and connect the wireless functionality device to the network of the customer premises.

Additionally and/or alternatively, when setting up the wireless functionality device, the user device 300 may automatically and dynamically allocate bandwidth to one or more devices communicatively coupled to the wireless functionality device. Alternatively, the user may manually select bandwidth allocations when setting up the wireless functionality device. In some instance, user device 300 may automatically and/or a user may manually prioritize one or more devices using the bandwidth of the wireless functionality device. For example, the user device 300 and/or the user may indicate that a cellphone or laptop be given bandwidth priority over a refrigerator and/or the like.

Additionally and/or alternatively, the user device 300 may automatically, and/or the user may manually, allocate bandwidth among multiple wireless functionality devices located in a customer premises, create a priority associated with each wireless functionality devices located in a customer premises, and/or the like. The user device 300 may automatically, and/or the user may manually, manage a WiFi mesh network created among the multiple wireless functionality devices.

FIGS. 3B and 3C depicts a user interface that provides the user with information (including current, up-to-date information) regarding the wireless functionality devices within the customer premises. In some embodiments, the user interface might provide the user with information regarding the various wireless functionality devices (as well as other devices) within the customer premises.

Turning to FIGS. 3B and 3C, the user interface might comprise a header portion 310b and 310c that provides the user with options to return to a previous screen (i.e., "Back," or the like), provides the user with a title or summary of the currently displayed screen (e.g., "Wireless Functionality Devices," "Devices and Rooms" etc.), and provides the user with options to indicate that the selections for the current screen are complete (i.e., "Done," or the like).

In each sub-panel, the user may be provided with additional options (i.e., when the user selects the menu icon in each sub-panel, or the like). For example, in sub-panels 320a and 325a, the user device 300 may allow a user to filter the wireless functionality devices within a customer premises by various characteristics. In a non-limiting example, the wireless functionality devices may be filtered based on the rooms where the wireless functionality devices are located, based on the signal strength of the wireless functionality devices, based on the signal strength of the wireless functionality devices as detected by user device 300 at a particular location, based on the available bandwidth, based on whether the wireless functionality devices are powered on or powered off, based on a number of devices connected to the wireless functionality device, based on one or more types of devices connected to the wireless functionality device, based on a specific device (e.g., living room TV, refrigerator, and/or the like) connected to the wireless functionality device, and/or the like. Sub-panels 320b and 325b may be used to display one or more characteristics corresponding to each of the wireless functionality device, including, but not limited to, whether the one or more wireless functionality devices are receiving power, whether the one or more wireless functionality devices are powered on or off, a signal strength of each of the wireless functionality devices, a bandwidth availability of each of the one or more wireless functionality devices, number of devices types of devices connected to each wireless functionality device, types of devices connected to each wireless functionality device, specific devices (e.g., living room TV, refrigerator, and/or the like) connected to each wireless functionality device, location of each device connected to each wireless functionality device, and/or the like.

FIG. 3D depicts alternative user interfaces that allow the user to view a network of connected devices including the wireless functionality devices within the customer premises.

Turning to FIG. 3D depicts a "Network" view in which gateway or router information is displayed in sub-panel 330a. In some cases, the router information might include, without limitation, average download bandwidth, bit rate, or speed (hereinafter, referred to simply as "bandwidth") within a predetermined period (e.g., 89 Mbps, as denoted by the numeric value within the gauge icon and as denoted by the download gauge in the non-limiting example in FIG. 3D), maximum actual download bandwidth within a predetermined period (e.g., 92 Mbps, as denoted by the dot in the gauge icon and the numeric value beside the dot in the example of FIG. 3D), subscribed download bandwidth within a predetermined period (e.g., 100 Mbps, in the example of FIG. 3D), average upload bandwidth within a predetermined period (e.g., 36 Mbps, as denoted by the numeric value within the gauge icon and as denoted by the upload gauge in the non-limiting example in FIG. 3D), maximum actual upload bandwidth within a predetermined period (e.g., 39 Mbps, as denoted by the dot in the gauge icon and the numeric value beside the dot in the example of FIG. 3D), subscribed upload bandwidth within a predetermined period (e.g., 50 Mbps, in the example of FIG. 3D), gateway or router information (e.g., make, model, serial number, etc.), information indicating secure or unsecure network (e.g., as denoted by the lock symbol above the router icon in FIG. 3D, and/or the like.

Sub-panel 330b might display icons of devices (including wireless functionality devices and other devices) within the network at particular ranges as denoted by the concentric semi-circular lines (with the line closest to the router icon being indicative of the strongest signal (as from a wired connection), and with lines progressively further from the router icon being indicative of weaker and weaker signal (as from various ranges of wireless connections). Additionally, sub-panel 330b might display one or more connections (e.g., wireless, wired, and/or the like) between devices.

In the embodiment of FIG. 3D, a living room TV might be connected to the local area network via wired connection (denoted by the line connecting the Living Room Wireless Functionality Device to the TV) to a wireless functionality device, while one or more lights and/or consoles might each be connected to the network via a wireless connection (denoted by the lightning bolt icons) through a wireless functionality device. In some cases, the lightning bolt icons denoting wireless connections might further include download and upload gauges.

Although FIG. 3D depicts particular devices such as wireless functionality devices, a TV, a console, and lights within the user interface, the various embodiments are not so limited, and the devices can include, without limitation, any combination of one or more user devices, one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, or one or more exercise equipment, and/or the like. The one or more user devices might include, but are not limited to, a tablet computer, a desktop computer, a laptop computer, a smart phone, a mobile phone, a personal digital assistant, a portable gaming device, a gaming console, a television, and/or the like. The one or more sensors might include, but are not limited to, at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like.

These and other functions of the wireless functionality device (and its components) are described in greater detail above and below with respect to FIGS. 1, 2, 4, and 5.

Figure 4A:
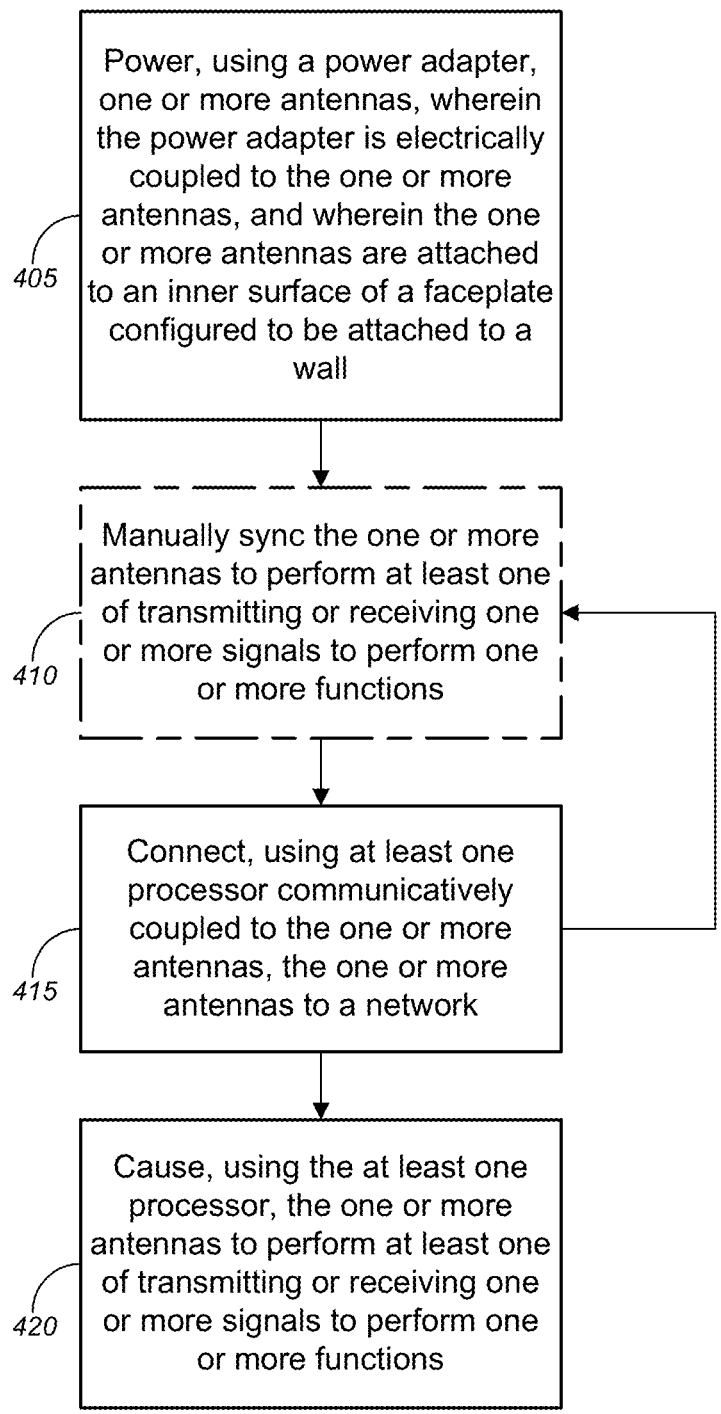
FIGS. 4A-4C are flow diagrams illustrating a method for implementing faceplate-based wireless device functionality, in accordance with various embodiments.
Figure 4B:
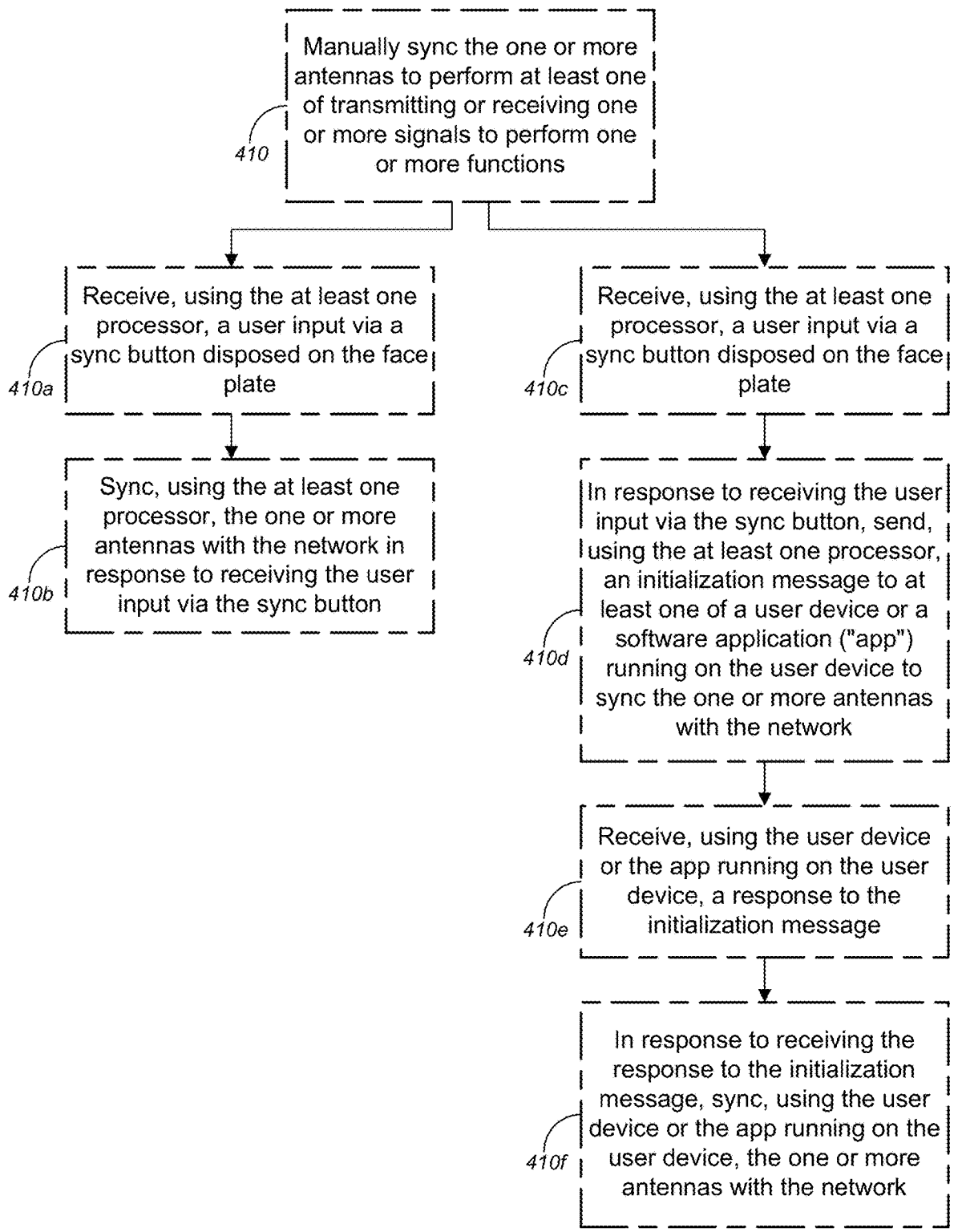
Figure 4C:
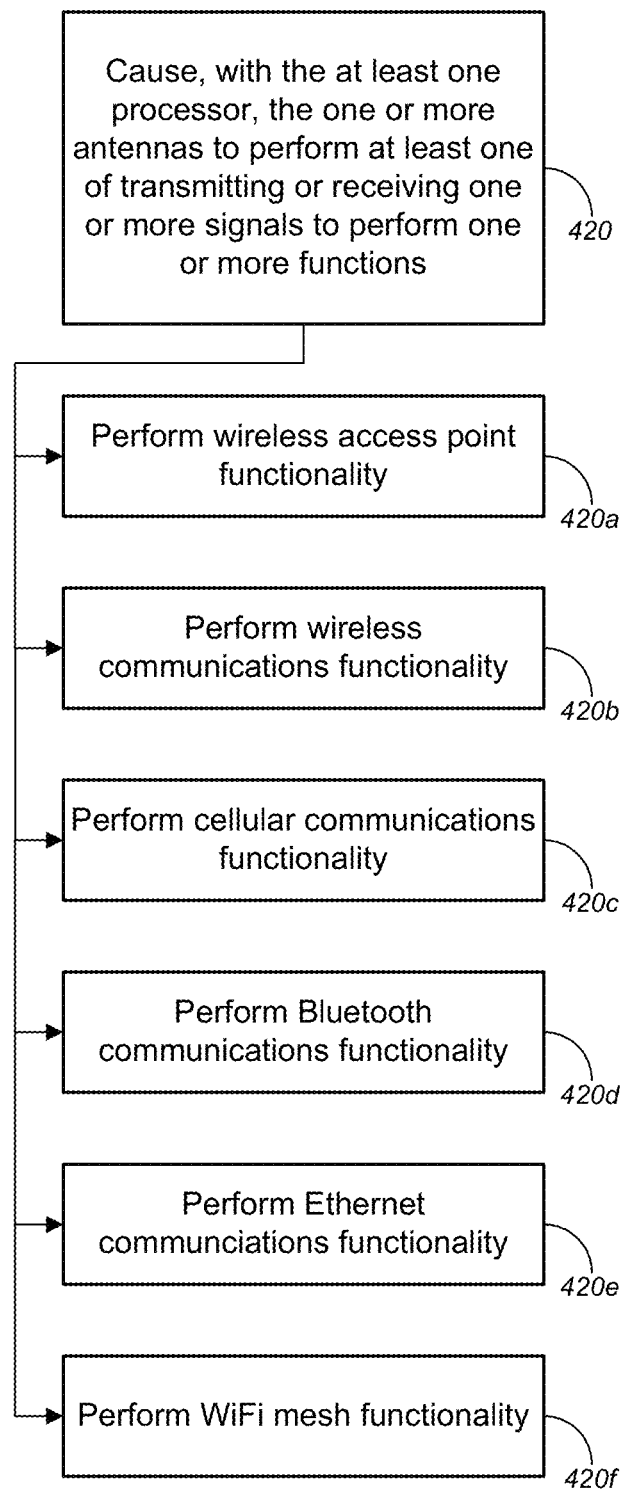

FIGS. 4A-4C (collectively, "FIG. 4") are flow diagrams illustrating a method 400 for implementing faceplate-based wireless device functionality, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 200", 200''', 300, and 500 of FIGS. 1, 2, 3, and 5 respectively (or components thereof), such methods may also be implemented using any suitable hardware (or software) implementation. Similarly, while each of the systems, examples, or embodiments 100, 200, 200', 200", 200''', 300, and 500 of FIGS. 1, 2, 3, and 5 respectively (or components thereof), can operate according to the method 400 illustrated by FIG. 4 (e.g., by executing instructions embodied on a computer readable medium), the systems, examples, or embodiments 100, 200, 200', 200", 200''', 300, and 500 of FIGS. 1, 2, 3, and 5 can each also operate according to other modes of operation and/or perform other suitable procedures.

In the non-limiting embodiment of FIG. 4A, method 400, at block 405, might comprise powering, using a power adapter, one or more antennas. The power adapter may be electrically coupled to the one or more antennas. In some cases, the power adapter may be electrically coupled to a power source. The power source may be at least one of a battery, an electrical wall outlet, a solar cell, or one or more electrical power wires disposed in the wall, and/or the like. In some embodiments, the one or more antennas may be attached to an inner surface of a faceplate configured to be attached to a wall. The one or more antennas may be embedded within the inner surface of the faceplate.

The one or more antennas may be configured to perform transmitting or receiving one or more signals to perform one or more functions. The one or more signals might include, without limitation, at least one of one or more radio communications signals, one or more WiFi communications signals, one or more cellular communications signals, or one or more Bluetooth communications signals, and/or the like.

At optional block 410, method 400 might comprise manually syncing the one or more antennas to perform at least one of transmitting or receiving the one or more signals to perform the one or more functions. Additionally and/or alternatively, method 400 might skip optional block 410 and continue to block 415 by connecting, using at least one processor communicatively coupled to the one or more antennas, the one or more antennas to a network. In some cases, the step of block 415, i.e., the step of connecting the one or more antennas to a network may include the step of optional block 410. Alternatively, the step of connecting the one or more antennas to a network may be done automatically without user input.

In order to automatically connect and sync the one or more antennas to a network, the at least one processor may automatically sync the one or more antennas by determining whether the one or more antennas have received power. Based on a determination that the one or more antennas have received power, the at least one processor may automatically sync and connect the wireless functionality device to the network.

In order to manually sync the one or more antennas, the method 400 might continue at optional block 410a by receiving, using at least one processor communicatively coupled to the one or more antennas, a user input via a sync button disposed on the faceplate. Method 400 might further comprise, at optional block 410b syncing, using the at least one processor, the one or more antennas with the network in response to receiving the user input via the sync button. Alternatively, in order to manually sync the one or more antennas, the method 400 might continue at optional block 410c by receiving, using the at least one processor, a user input via a sync button disposed on the faceplate. In response to receiving the user input via the sync button, method 400 might include sending, with the at least one processor, an initialization message to at least one of a user device or a software application ("app") running on the user device to sync the one or more antennas with the network (optional block 410d) and receiving, with the user device or the app running on the user device, a response to the initialization message (optional block 410e). In response to receiving the response to the initialization message, method 400 at block 410d might continue by syncing, with the user device or the app running on the user device, the one or more antennas with the network.

In yet another case, in order to manually sync the one or more antennas, the at least one processor may determine the one or more antennas have received power. In response to determining that the one or more antennas have received power, the at least one processor may send an initialization message to at least one of a user device or a software application ("app") running on the user device to sync the one or more antennas with the network. The initialization message may be sent to a nearby user device (e.g., a cellphone, a tablet, a computer, and/or the like) via a Bluetooth wireless connection and/or a WiFi wireless connection. The user device may receive a response to the initialization message from the user and, in response to receiving the response to the initialization message, the user device may sync and connect the one or more antennas to the network.

In some cases, if the processor determines that the one or more antennas did not automatically sync and connect to the network, then the processor may indicate on a display and/or via user interface located on the faceplate that the one or more antennas did not automatically sync and connect to the network. For example, a sync button located on the faceplate may flash a red light indicating that the one or more antennas did not automatically sync and connect to the network. The processor may then wait to receive input via display and/or via user interface and, in response to receiving user input, the at least one processor may try to sync and connect the one or more antennas to the network.

Alternatively, if the processor determines that the one or more antennas did not automatically sync and connect to the network and/or that user input via display and/or via user interface did not cause the one or more antennas to automatically sync and connect to the network, the processor may send an initialization message to at least one of the user device 125 or a software application ("app") running on the user device to sync the one or more antennas with the network. The user device may receive a response to the initialization message from the user and, in response to receiving the response to the initialization message, the user device may sync and connect the one or more antennas to the network.

Once the one or more antennas are connected to the network, the method 400 might continue at block 420 by causing, using the at least one processor, the one or more antennas to perform at least one of transmitting or receiving one or more signals to perform one or more functions. Referring to FIG. 4C, performing the one or more first functions might comprise at least one of: performing wireless access point functionality (block 420a); performing wireless communications functionality (block 420b); performing cellular communications functionality (block 420c); performing Bluetooth communications functionality (block 420d); performing Ethernet communications functionality (block 420e); or performing WiFi mesh functionality (block 420f); and/or the like.

Figure 5:
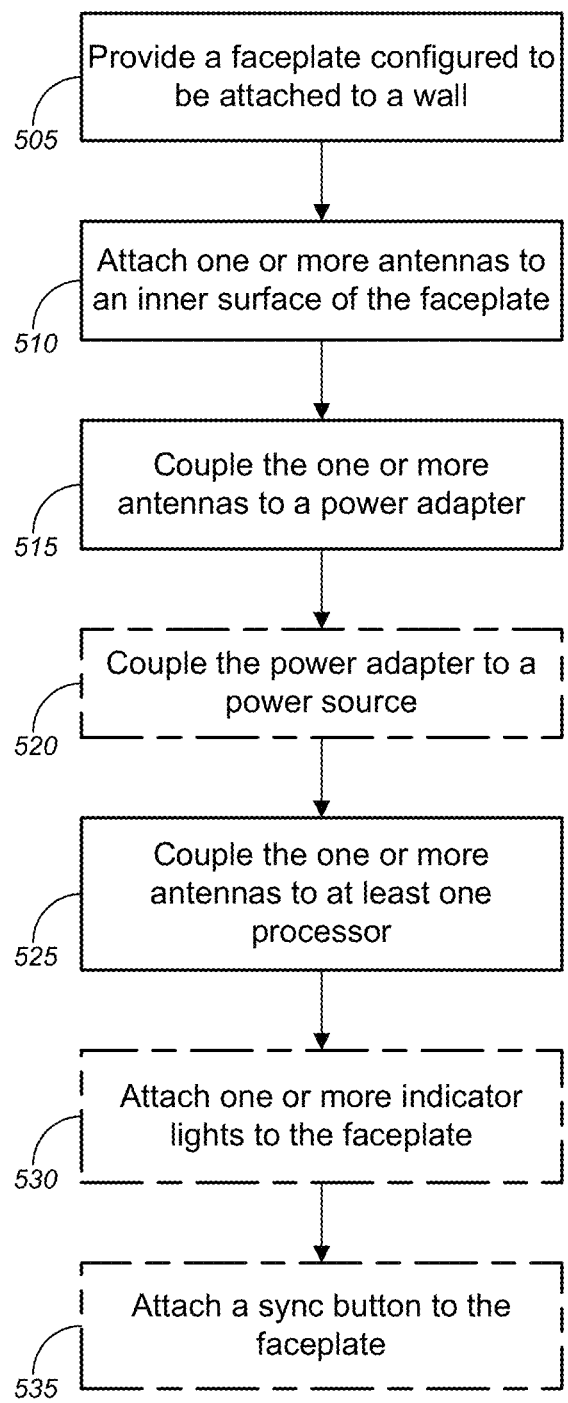
FIG. 5 is a flow diagram illustrating a method for making faceplate-based wireless device functionality, in accordance with various embodiments.

FIG. 5 is a flow diagram illustrating a method 400 for making a wireless functionality device, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 200', 200", 200"', 300, and 400 of FIGS. 1, 2A-2M, 2N, 2O, 2P, 3, and 4 respectively (or components thereof), such methods may also be implemented using any suitable hardware (or software) implementation. Similarly, while each of the systems, examples, or embodiments 100, 200, 200', 200", 200"', 300, and 400 o of FIGS. 1, 2A-2M, 2N, 2O, 2P, 3, and 4 respectively (or components thereof), can be made according to the method 500 illustrated by FIG. 5, the systems, examples, or embodiments 100, 200, 200', 200", 200"', 300, and 400 of FIGS. 1, 2A-2M, 2N, 2O, 2P, 3, and 4 can each also be made according to other method of making.

In the non-limiting embodiment of FIG. 5, method 500, at block 505, might comprise providing a faceplate configured to be attached to a wall. The face plate may include, without limitation, at least one of a wall face plate, a power outlet face plate, a data connection face plate, an ethernet connection face plate, a coaxial connection face plate, a light switch face plate, an audio connection plate, a video connection face plate, or a multi-function faceplate, and/or the like. The multi-function faceplate may be a faceplate combining features of two or more of the other faceplates. In a non-limiting example, the multi-function faceplate may include two or more features of a wall faceplate, a power outlet faceplate, a data connection faceplate, an Ethernet connection faceplate, a coaxial cable connection faceplate, a light switch faceplate, an audio connection faceplate, a video connection faceplate, and/or the like.

At block 510, method 500 might comprise attaching one or more antennas to an inner surface of the face plate. The one or more antennas may be attached to the inner surface of the faceplate via a least one of a resin, a glue, one or more screws, and/or the like. In some instances, the one or more antennas may be fully embedded or partially embedded within the face plate. In a non-limiting example, the faceplate may be 3D-printed around the one or more antennas to embed the one or more antennas within the faceplate. Additionally and/or alternatively, a power adapter and a processor may be attached to the inner surface of the faceplate in a similar manner.

The one or more antennas may further be configured to perform at least one of transmitting or receiving one or more signals to perform one or more functions. The one or more signals may include, without limitation, at least one of one or more radio communications signals, one or more WiFi communications signals, one or more cellular communications signals, or one or more Bluetooth communications signals, and/or the like. The one or more functions may include, without limitation, performing wireless access point functionality; performing wireless communications functionality; performing cellular communications functionality; performing Bluetooth communications functionality; performing Ethernet communications functionality; WiFi extension functionality; cellular extension functionality; Bluetooth extension functionality; or performing WiFi mesh functionality; and/or the like.

Next, at block 515, the method 500 might include coupling the one or more antennas to a power adapter. The power adapter may be configured to provide power to the one or more antennas. In some instances, the power adapter might convert (or transform) electricity (i.e., by regulating voltage, stepping-up or stepping down voltage, limiting current, etc.) that is transmitted to the one or more antennas.

At optional block 520, the method 500 might continue by coupling the power adapter to a power source. The power source might be integrated into the power adapter or separate from the power adapter. The power source might be, without limitation, a battery, an electrical wall outlet, a solar cell, or one or more electrical power wires disposed in the wall, and/or the like. In some cases, by wiring the one or more antennas to the one or more electrical power wires disposed in the wall, the one or more antennas may be configured to transmit communications signals or receive communications signals over powerline.

In various instances, the power adapter may be electrically coupled to both a battery and one or more electrical power wires disposed in the wall. The battery may serve as a backup if power to the one or more electrical power wires disposed in the wall goes out during a power outage. This ensures that the one or more antennas always receive power. Additionally, in some instances, when the router or gateway of a customer premises have one or more battery backups and when the wireless functionality devices are configured as WiFi extension devices, then WiFi within a customer premises may continue to function within a customer premises even during a power outage due to the battery backup.

In some embodiments, method 500, at block 525 might include coupling the one or more antennas to at least one processor. The at least one processor may be configured to cause the one or more antennas to connect to a network and to cause the one or more antennas to perform the one or more functions.

In some instances, method 500, at optional block 530 might include attaching one or more indicator lights to the faceplate. In various cases, the one or more indicator lights might be attached to an outer surface of the faceplate and/or the one or more indicator lights might be attached to an edge of faceplate. The one or more indicator lights may be configured to indicate at least one of: whether the one or more antennas are receiving power; whether the one or more antennas are powered on or off; a signal strength of the one or more signals; a bandwidth availability of the one or more antennas; or a detection of motion in front of the faceplate; and/or the like. In a few non-limiting examples, the one or more indicator lights may be green when the one or more antennas are receiving power and/or when the one or more antennas are powered on. The one or more indicator lights may be off when the one or more antennas are powered off. A number of indicator lights turned on or a color of indicator lights may indicate a signal strength of the one or more signals. For example, four indicator lights turned on or green indicator lights may indicate that strong signal strength while one indicator light turned on or red indicator lights may indicate low signal strength. In some cases, the one or more indicator lights may be powered on when the one or more sensors detect motion and/or when the one or more sensors detect that one or more lights in a room have been powered off.

In various embodiments, method 500, at optional block 535, might continue by attaching one or more sync buttons to the faceplate. In some embodiments, the at least one processor might be configured to receive a user input via a sync button disposed on the faceplate and sync the one or more antennas with the network in response to receiving the user input via the sync button. In other embodiments, the at least one processor might be configured to receive a user input via a sync button disposed on the faceplate and in response to receiving the user input via the sync button, send, with the at least one processor, an initialization message to at least one of a user device or a software application ("app") running on the user device to sync the one or more antennas with the network. The initialization message might be sent to the user device via a Bluetooth connection or a WiFi connection.

Exemplary System and Hardware Implementation

Figure 6:
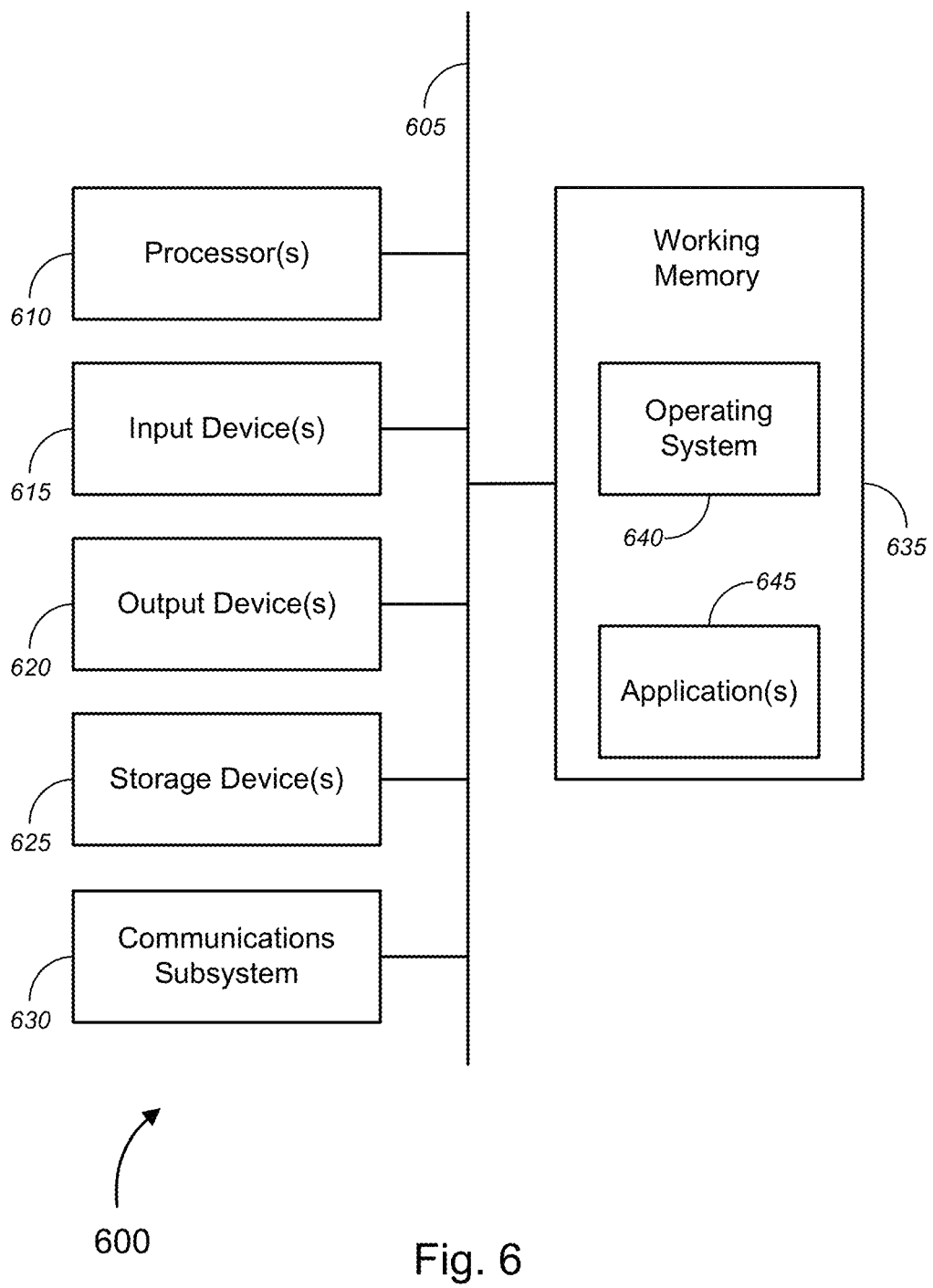
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., wireless functionality devices 105 and 230, user device(s) 125 and 300, gateway 130, and computing system 145, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., wireless functionality devices 105 and 230, user device(s) 125 and 300, gateway 130, and computing system 145, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
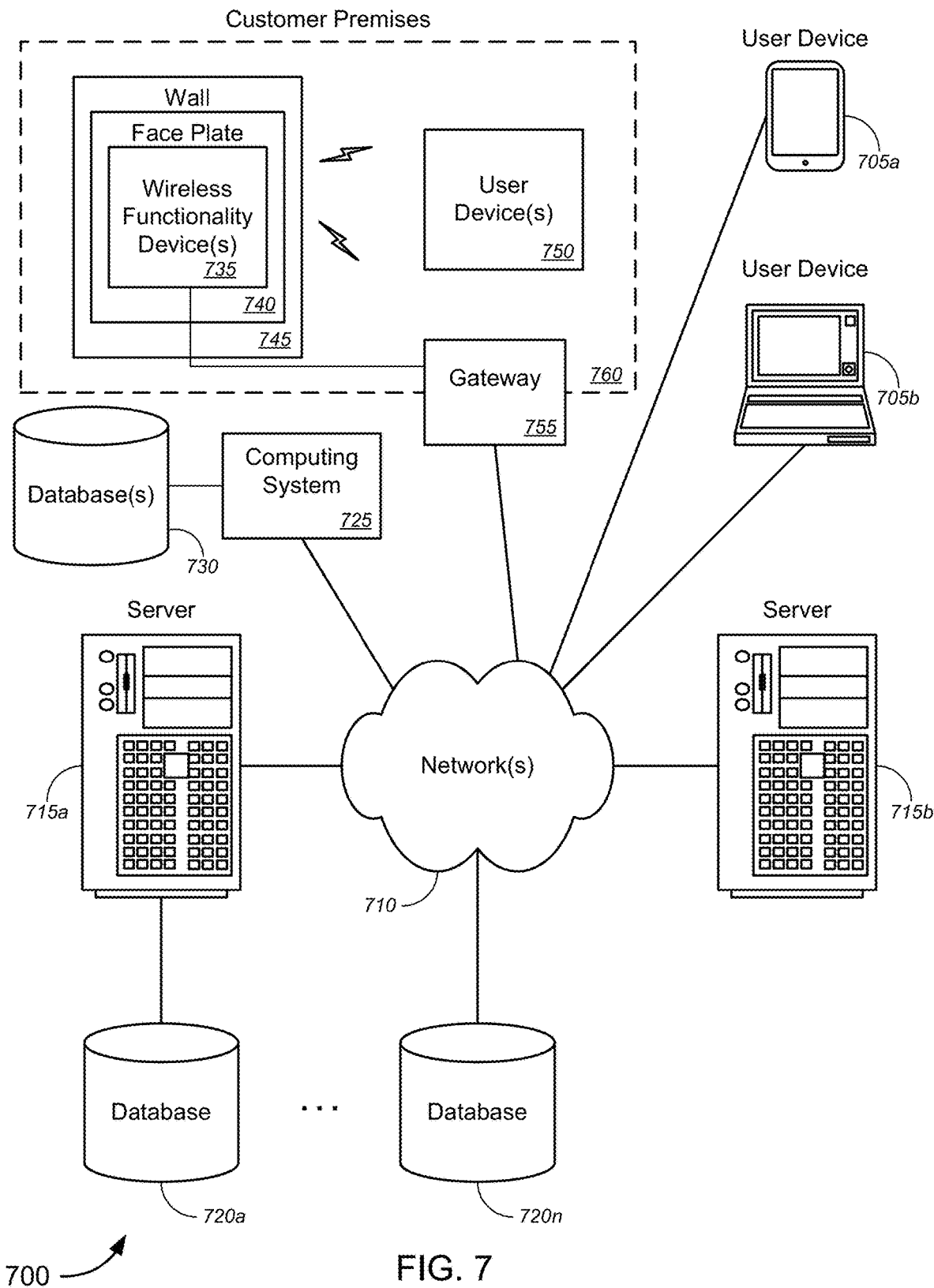
FIG. 7 is a block diagram illustrating a networked system of computers, computing systems, or system hardware architecture, which can be used in accordance with various embodiments.

As noted above, a set of embodiments comprises methods and systems for implementing wireless functionality, and, more particularly, to methods, systems, and apparatuses for implementing faceplate-based wireless device functionality and wireless extension functionality. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network(s) 140 and 155 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing wireless functionality, and, more particularly, to methods, systems, and apparatuses for implementing faceplate-based wireless device functionality and wireless extension functionality, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a computing system 725 (similar to computing system 145 of FIG. 1, or the like) and corresponding database(s) 730 (similar to database(s) 150 of FIG. 1, or the like). System 700 might further comprise wireless functionality devices 735 (similar to wireless functionality devices 105 and 230 of FIGS. 1 and 2, or the like), one or more faceplates (similar to faceplates 115, 205, 205', 205", and 205''' of FIGS. 1 and 2, or the like) disposed on a wall(s) 745 (similar to wall(s) 120 and 220 of FIGS. 1 and 2, or the like) of customer premises 760 (similar to customer premises 135 of FIG. 1, or the like), one or more user devices 750 (similar to user devices 125 and 300 of FIGS. 1 and 3), and a gateway 755 (similar to gateway 130 of FIG. 1, or the like), each disposed at customer premises 760.

In operation, the wireless functionality device 735 might include one or more antennas, a power adapter, and at least one processor. The wireless functionality device 735 may be attached to an inner surface of the faceplate 740 configured to be attached to wall 745. The one or more antennas of the wireless functionality 735 device may be electrically coupled to the power adapter and communicatively coupled to the at least one processor.

In operation, the wireless functionality device 735 may be powered using the power adapter electrically coupled to the one or more antennas and the at least one processor. When the wireless functionality device 735 initially receives power and/or, when the at least one processor receives a user input requesting that the one or more antennas connect to a network, the at least one processor communicatively coupled to the one or more antennas might connect the one or more antennas to the network. The at least one processor might then cause the wireless functionality device 735 to perform at least one of transmitting or receiving one or more signals to perform one or more functions.

These and other functions of the system 600 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
powering, using a power adapter, one or more antennas, wherein the power adapter is electrically coupled to the one or more antennas, and wherein the one or more antennas are attached to an inner surface of a faceplate configured to be attached to a wall;
connecting, using at least one processor communicatively coupled to the one or more antennas, the one or more antennas to a network;
causing, using the at least one processor, the one or more antennas to perform at least one of transmitting or receiving one or more signals to perform one or more functions;
receiving, using the at least one processor, a user input via a sync button disposed on the faceplate; and
syncing, using the at least one processor, the one or more antennas with the network in response to receiving the user input via the sync button.

2. The method of claim 1, wherein the faceplate comprises at least one of a wall faceplate, a power outlet faceplate, a data connection faceplate, an Ethernet connection faceplate, a coaxial cable connection faceplate, a light switch faceplate, an audio connection faceplate, a video connection faceplate, or a multi-function faceplate.

3. The method of claim 1, wherein the one or more antennas are embedded within the inner surface of the faceplate.

4. The method of claim 1, wherein the one or more signals comprise at least one of one or more radio communications signals, one or more WiFi communications signals, one or more cellular communications signals, or one or more Bluetooth communications signals.

5. The method of claim 1, wherein performing the one or more functions comprises at least one of:
performing wireless access point functionality;
performing wireless communications functionality;
performing cellular communications functionality;
performing Bluetooth communications functionality;
performing Ethernet communications functionality; or
performing WiFi mesh functionality.

6. The method of claim 1, wherein the one or more antennas are communicatively coupled to an Ethernet connection, wherein the one or more antennas are further configured to perform at least one of transmitting the one or more signals to the Ethernet connection or receiving the one or more signals from the Ethernet connection.

7. The method of claim 6, wherein the Ethernet connection is at least one of an Ethernet port, one or more Ethernet cables disposed in the wall, or one or more Ethernet wires disposed in the wall.

8. The method of claim 1, wherein the one or more antennas or the at least one processor, via the one or more antennas, is at least one of:
communicatively coupled to one or more user devices via a first wired connection;
communicatively coupled to the one or more user devices via a first wireless connection;
communicatively coupled to at least one of a router or a gateway device via a second wired connection;
communicatively coupled to at least one of the router or the gateway device via a second wireless connection;
communicatively coupled to the one or more user devices via a third wired connection and communicatively coupled to at least one of the router or the gateway device via a fourth wired connection;
communicatively coupled to the one or more user devices via a third wireless connection and communicatively coupled to at least one of the router or the gateway device via a fourth wireless connection;
communicatively coupled to the one or more user devices via a fifth wireless connection and communicatively coupled to at least one of the router or the gateway device via a fifth wired connection; or communicatively coupled to the one or more user devices via a sixth wired connection and communicatively coupled to at least one of the router or the gateway device via a sixth wireless connection.

9. The method of claim 1, further comprising:
receiving, using the at least one processor, a user input via a sync button disposed on the faceplate;
in response to receiving the user input via the sync button, sending, using the at least one processor, an initialization message to at least one of a user device or a software application ("app") running on the user device to sync the one or more antennas with the network;
receiving, with the user device or the app running on the user device, a response to the initialization message; and
in response to receiving the response to the initialization message, syncing, using the user device or the app running on the user device, the one or more antennas with the network.

10. The method of claim 1, wherein one or more indicator lights are attached to the faceplate, wherein the one or more indicator lights are configured to indicate at least one of:
whether the one or more antennas are receiving power;
whether the one or more antennas are powered on or off;
a signal strength of the one or more signals;
a bandwidth availability of the one or more antennas; or
a detection of motion in front of the faceplate.

11. The method of claim 1, wherein the one or more indicator lights are located on at least one of a front face of the faceplate or an edge of the faceplate.

12. An apparatus, comprising:
a faceplate configured to be attached to a wall;
one or more antennas attached to an inner surface of the faceplate and configured to perform at least one of transmitting or receiving one or more signals to perform one or more functions;
a power adapter electrically coupled to the one or more antennas and configured to provide power to the one or more antennas;
at least one processor communicatively coupled to the one or more antennas; and
a non-transitory computer readable medium communicatively coupled to the at least one processor, the non-transitory computer readable medium having stored thereon computer software comprising a set of instructions that, when executed by the at least one processor, causes the apparatus to:
connect the one or more antennas to a network;
cause the one or more antennas to perform the one or more functions;
receive a user input via a sync button disposed on the faceplate; and
sync the one or more antennas with the network in response to receiving the user input via the sync button.

13. The apparatus of claim 12, wherein the faceplate comprises at least one of a wall faceplate, a power outlet faceplate, a data connection faceplate, an Ethernet connection faceplate, a coaxial cable connection faceplate, a light switch faceplate, an audio connection plate, a video connection faceplate, or a multi-function faceplate.

14. The apparatus of claim 12, wherein the power adapter is electrically coupled to a power source, wherein the power source is at least one of a battery, an electrical wall outlet, a solar cell, or one or more electrical power wires disposed in the wall.

15. The apparatus of claim 12, wherein the one or more signals comprise at least one of one or more radio communications signals, one or more WiFi communications signals, one or more cellular communications signals, or one or more Bluetooth communications signals.

16. The apparatus of claim 12, wherein performing the one or more functions comprises at least one of:
performing wireless access point functionality;
performing wireless communications functionality;
performing cellular communications functionality;
performing Bluetooth communications functionality;
performing Ethernet communications functionality; or
performing WiFi mesh functionality.

17. The apparatus of claim 12, wherein the one or more antennas or the at least one processor, via the one or more antennas, is at least one of:
communicatively coupled to one or more user devices via a first wired connection;
communicatively coupled to the one or more user devices via a first wireless connection;
communicatively coupled to at least one of a router or a gateway device via a second wired connection;
communicatively coupled to at least one of the router or the gateway device via a second wireless connection;
communicatively coupled to the one or more user devices via a third wired connection and communicatively coupled to at least one of the router or the gateway device via a fourth wired connection;
communicatively coupled to the one or more user devices via a third wireless connection and communicatively coupled to at least one of the router or the gateway device via a fourth wireless connection;
communicatively coupled to the one or more user devices via a fifth wireless connection and communicatively coupled to at least one of the router or the gateway device via a fifth wired connection; or
communicatively coupled to the one or more user devices via a sixth wired connection and communicatively coupled to at least one of the router or the gateway device via a sixth wireless connection.

18. A system, comprising:
a plurality of wireless functionality devices, each wireless functionality device comprising:
a faceplate configured to be attached to a wall;
one or more antennas attached to an inner surface of the faceplate and configured to perform at least one of transmitting or receiving one or more signals to perform one or more functions;
a power adapter electrically coupled to the one or more antennas and configured to provide power to the one or more antennas;
at least one processor communicatively coupled to the one or more antennas; and
a non-transitory computer readable medium communicatively coupled to the at least one processor, the non-transitory computer readable medium having stored thereon computer software comprising a set of instructions that, when executed by the at least one processor, causes said wireless functionality device to:
connect the one or more antennas to a network;
cause the one or more antennas to perform the one or more functions;
receive a user input via a sync button disposed on the faceplate; and
sync the one or more antennas with the network in response to receiving the user input via the sync button.

19. The system of claim 18, wherein the plurality of wireless functionality devices is communicatively coupled together to form a mesh network.

* * * * *